United States Patent
Abdolvand

(10) Patent No.: US 10,807,197 B2
(45) Date of Patent: Oct. 20, 2020

(54) METHOD OF, AND APPARATUS FOR, LASER BLACKENING OF A SURFACE, WHEREIN THE LASER HAS A SPECIFIC POWER DENSITY AND/OR A SPECIFIC PULSE DURATION

(71) Applicant: University of Dundee, Dundee (GB)

(72) Inventor: Amin Abdolvand, Dundee (GB)

(73) Assignee: University of Dundee, Dundee (GB)

( * ) Notice: Subject to any disclaimer, the term of this patent is extended or adjusted under 35 U.S.C. 154(b) by 273 days.

(21) Appl. No.: 15/739,074

(22) PCT Filed: Jun. 24, 2016

(86) PCT No.: PCT/GB2016/051908
§ 371 (c)(1),
(2) Date: Dec. 21, 2017

(87) PCT Pub. No.: WO2016/207659
PCT Pub. Date: Dec. 29, 2016

(65) Prior Publication Data
US 2018/0185958 A1    Jul. 5, 2018

(30) Foreign Application Priority Data

Jun. 24, 2015 (GB) ................... 1511153.7
Jun. 24, 2015 (GB) ................... 1511154.5
(Continued)

(51) Int. Cl.
*B23K 26/352* (2014.01)
*B23K 26/00* (2014.01)
(Continued)

(52) U.S. Cl.
CPC ...... *B23K 26/3584* (2018.08); *B23K 26/0006* (2013.01); *B23K 26/0624* (2015.10);
(Continued)

(58) Field of Classification Search
CPC ............ B23K 26/3584; B23K 26/0624; B23K 26/082; B23K 26/352; B23K 26/006
(Continued)

(56) References Cited

U.S. PATENT DOCUMENTS

| 5,483,038 A | 1/1996 | Ota et al. |
| 6,407,363 B2 | 6/2002 | Dunsky et al. |

(Continued)

FOREIGN PATENT DOCUMENTS

| CN | 102369081 | 3/2012 |
| CN | 102792193 | 11/2012 |

(Continued)

OTHER PUBLICATIONS

PCT International Search Report, dated Oct. 7, 2016, for corresponding PCT International Application No. PCT/GB2016/051908 (5 pages).
(Continued)

*Primary Examiner* — Christine J Skubinna
(74) *Attorney, Agent, or Firm* — Myers Bigel, P.A.

(57) ABSTRACT

A method of blackening a surface, comprises applying laser radiation to the surface of a target (10) to produce a periodic arrangement of structures on the surface of the target (10), wherein the laser radiation comprises pulsed laser radiation comprising a series of laser pulses and the power density of the pulses is in a range 2 $GW/cm^2$ to 50 $GW/cm^2$ or 0.1 $TW/cm^2$ to 3 $TW/cm^2$, and/or a pulse duration between 200 femtoseconds to 1000 picoseconds.

21 Claims, 30 Drawing Sheets

(30) Foreign Application Priority Data

| Sep. 30, 2015 | (GB) | ................................. | 1517232.3 |
| Sep. 30, 2015 | (GB) | ................................. | 1517235.6 |
| Mar. 8, 2016 | (GB) | ................................. | 1603991.9 |

(51) Int. Cl.

| *B23K 26/082* | (2014.01) |
| *B23K 26/0622* | (2014.01) |
| *B23K 103/04* | (2006.01) |
| *B23K 103/06* | (2006.01) |
| *B23K 103/10* | (2006.01) |
| *B23K 103/12* | (2006.01) |
| *B23K 103/14* | (2006.01) |

(52) U.S. Cl.
CPC .......... *B23K 26/082* (2015.10); *B23K 26/352* (2015.10); *B23K 2103/05* (2018.08); *B23K 2103/06* (2018.08); *B23K 2103/10* (2018.08); *B23K 2103/12* (2018.08); *B23K 2103/14* (2018.08)

(58) Field of Classification Search
USPC .................................................. 219/121.61
See application file for complete search history.

(56) References Cited

U.S. PATENT DOCUMENTS

| 6,518,540 | B1 | 2/2003 | Wee et al. |
| 6,670,571 | B2 | 12/2003 | Dance |
| 8,743,165 | B2 | 6/2014 | Sandström |
| 9,409,254 | B2 | 8/2016 | Hackel |
| 9,413,137 | B2 | 8/2016 | Haden et al. |
| 10,315,278 | B2 | 6/2019 | Wang et al. |
| 2007/0199927 | A1 | 8/2007 | Gu et al. |
| 2008/0216926 | A1 | 9/2008 | Guo |
| 2010/0176101 | A1 | 7/2010 | Costin et al. |
| 2011/0089039 | A1 | 4/2011 | Nashner |
| 2012/0015118 | A1 | 1/2012 | Zheludev |
| 2012/0018993 | A1 | 1/2012 | Boegli |
| 2012/0243094 | A1 | 9/2012 | Boegli |
| 2013/0017948 | A1 | 1/2013 | Charlson |
| 2013/0020297 | A1 | 1/2013 | Gupta |
| 2013/0083500 | A1 | 4/2013 | Prest et al. |
| 2013/0126573 | A1 | 5/2013 | Hosseini et al. |
| 2013/0143013 | A1 | 6/2013 | Reichenbach |
| 2013/0208074 | A1 | 8/2013 | Zhang |
| 2013/0251960 | A1 | 9/2013 | Zhang |
| 2014/0083984 | A1 | 3/2014 | Gerke |
| 2014/0147694 | A1 | 5/2014 | Harrison |
| 2014/0154526 | A1 | 6/2014 | Guo |
| 2014/0185065 | A1 | 7/2014 | Shah |
| 2015/0049593 | A1 | 2/2015 | Oliveira |
| 2015/0290744 | A1 | 10/2015 | Bilhe et al. |
| 2016/0167170 | A1 | 6/2016 | Terasaki et al. |
| 2016/0169531 | A1 | 6/2016 | Wagner et al. |
| 2017/0021654 | A1 | 1/2017 | Bilhe et al. |
| 2017/0292190 | A1 | 10/2017 | Montero et al. |
| 2018/0142338 | A1 | 5/2018 | Yokota et al. |
| 2018/0178319 | A1 | 6/2018 | Abdolvand |
| 2018/0238178 | A1 | 8/2018 | Lampenscherf et al. |

FOREIGN PATENT DOCUMENTS

| CN | 103586578 | 2/2014 |
| EP | 2338681 | 6/2011 |
| JP | 2002287191 | 10/2002 |
| KZ | 18694 | 12/2009 |
| KZ | 17540 | 1/2010 |
| KZ | 23611 | 12/2010 |
| RU | 2094225 | 10/1997 |
| RU | 2268814 | 1/2006 |
| RU | 2433896 | 11/2009 |
| RU | 2447012 | 4/2012 |
| WO | 2013151451 | 10/2013 |
| WO | 2015189645 | 12/2015 |

OTHER PUBLICATIONS

PCT International Written Opinion of the International Searching Authority, dated Oct. 7, 2016, for corresponding PCT International Application No. PCT/GB2016/051908 (6 pages).
Vorobyev et al. "Colorizing metals with femtosecond laser pulses", *Applied Physics Letters*, A I P Publishing LLC, US, vol. 92, No. 4, Jan. 31, 2008, pp. 041914-1-041914-3, XP012107943, ISSN: 0003-6951, DOI: 10.1063/1.2834902.
PCT International Search Report and Written Opinion issued for corresponding International Application No. PCT/GB2017/050621, dated Jul. 13, 2017 (12 pages).
PCT International Search Report and Written Opinion issued for corresponding International Application No. PCT/GB2016/051908, dated Oct. 7, 2016 (14 pages).
PCT International Search Report and Written Opinion issued for corresponding International Application No. PCT/GB2016/051909, dated Oct. 12, 2016 (14 pages).
Baglin, "The Secondary Electron Yield of Technical Materials and its Variation with Surface Treatments", Proceedings of EPAC 2000, Vienna, Austria, pp. 217-221).
Cern Bulletin, Issue No. 24-25/2014, Jun. 9, 2014, Particle Kickers (2 pages).
"Ultra-Intense Laser Blast Creates True 'Black Metal'", Rochester News, University of Rochester, Nov. 21, 2006 (2 pages).
Chunlei Guo, group webpage, http://www2.optics.rochester.edu/workgroups/guo/about.html, (2 pages).
Penide et al., "High Contrast Laser Marking of Alumina", Applied Surface Science, 336 (2015), pp. 118-128.
Vorobyev et al., "Colorizing Metals with Femtosecond Laser Pulses", Applied Physics Letters, 92, 041914-1-041914-3, (2008).
Vorobyev et al., "Enhanced Absorption of Metals Over Ultrabroad Electromagnetic Spectrum", Applied Physics Letters, 95, 121106-1-121106-3 (2009).
Vorobyev et al., "Femtosecond Laser Blackening of Platinum", Journal of Applied Physics, 104, 053516-1-053516-4, (2008).
Tang et al., "Nanosecond Pulsed Laser Blackening of Copper", Applied Physics Letters, 101, 231902-1-231902-4, (2012).
Yang et al., "Ultra-Broadband Enhanced Absorption of Metal Surfaces Structured by Femtosecond Laser Pulses", Optics Express, vol. 16, No. 15, Jul. 21, 2008, pp. 11259-11265.
Fan et al., "Rapid Fabrication of Surface Micro/Nano Structures with Enhanced Broadband Absorption on Cu by Picosecond Laser", Optics Express, vol. 21, No. 10, May 20, 2013, pp. 11628-11637.
John H. Booske, "Plasma Physics and Related Challenges of Millimeter-Wave-to-Terahertz and High Power Microwave Generation", Physics of Plasmas, 15, 055502-1-055502-16 (2008).
Pivi et al., "Sharp Reduction of the Secondary Electron Emission Yield from Grooved Surfaces", Journal of Applied Physics, 104, 104904-1-104904-10.
Vorobyev et al., "Enhanced Absorptance of Gold Following Multipulse Femtosecond Laser Ablation", Physical Review B, 72, 195422-1-195422-5 (2005).
Walker et al., "The Secondary Electron Emission Yield for 24 Solid Elements Excited by Primary Electrons in the Range 250-5000 ev: A Theory/Experiment Comparison", Scanning vol. 30, pp. 365-380, (2008).
Li et al., "Influence of Surface Morphology on Corrosion and Electronic Behavior", Acta Materialia, 54, pp. 445-452, (2006).
Valizadeh et al., "Low Secondary Electron Yield Engineered Surface for Electron Cloud Mitigation", Applied Physics Letters, 105, 231605-1-231605-5 (2014).
Goudket et al., "Surface Resistance RF Measurements of Materials Used for Accelerator Vacuum Chambers", 6th International Particle Accelerator Conference, IPAC2015, Richmond, VA, pp. 3235-3238.
Valizadeh et al., "Low Secondary Electron Yield of Laser Treated Surfaces of Copper, Aluminium and Stainless Steel", Proceedings of IPAC2016, Busan, Korea, pp. 1089-1092.

(56) References Cited

OTHER PUBLICATIONS

Dominguez et al., "First Electron-Cloud Studies at the Large Hadron Collider", Physical Review Special Topics—Accelerators and Beams, 16, 011003-1-011003-18, (2013).
Ducimetiere et al., "The LHC Injection Kicker Magnet", Proceedings of the 2003 Particle Accelerator Conference, pp. 1162-1164.
Examination Report dated Mar. 13, 2019 for European Application No. 16741107.3 (5 pages).
Russian Office Action and Search Report corresponding to RU 2018102523, dated Dec. 23, 2019 (11 pages To include English translation of Search Report).

Other examples of *TYPE C (LESS)-Tophat pyramids* surfaces with power densities in [TW/cm²] of (a) = 0.54; (b)= 0.38; (c) = 0.28; (d) = 0.22; (e) = 0.16

(a) and (b)

(c) and (d)

(e)

and example of *Type C (LESS) – lines* surfaces with power densities in [TW /cm²] of 0.4 and another example of *Type C (LESS) – lines* surfaces with power densities in [TW/cm²] of 0.2

A thickness of approximately 50 μm was affected by the texturizing

Type AC (532) surface

Type C (top-hat pyramids) with deep cavities
Same as type "C" – our present baseline
Power Density = 0.38, 0.41, 0.54, 0.6 TW/cm$^2$ Type C (grooves) with deep cavities
Power Density = 0.38, 0.41, 0.54, 0.6 TW/cm$^2$ Note: treatment time is of course cut by half Type C (top-hat pyramids) with shallow cavities
Power Density = 0.16, 0.22, 0.28 TW/cm²

Note: our high contrast marking parameter

Type C1 (grooves) with shallow cavities
Power Density = 0.16, 0.22, 0.28 TW/cm$^2$ Note: our high contrast marking parameter

Summary

- Type «C grooves with deep cavities» has an SEY almost as good as type «C top-hat pyramids with deep cavities» (a.k.a. our usual type «C»)
- Outgassing as measured by Ivo on type «C top-hat pyramids with deep cavities» was reasonable. We expect that outgassing on sample treated with grooves only should be better

METHOD OF, AND APPARATUS FOR, LASER BLACKENING OF A SURFACE, WHEREIN THE LASER HAS A SPECIFIC POWER DENSITY AND/OR A SPECIFIC PULSE DURATION

RELATED APPLICATIONS

This application is a 35 U.S.C. § 371 national stage application of PCT Application No. PCT/GB2016/051908, filed on Jun. 24, 2016, which claims priority from Great Britain Patent Application Nos. 1511153.7, filed on Jun. 24, 2015, 1511154.5, filed on Jun. 24, 2015, 1517232.3, filed on Sep. 30, 2015, 1517235.6, filed on Sep. 30, 2015, and 1603991.9, filed on Mar. 8, 2016, the contents of which are incorporated herein by reference in their entireties. The above-referenced PCT International Application was published in the English language as International Publication No. WO 2016/207659 A1 on Dec. 29, 2016.

The present invention relates to methods of, and apparatus for, laser blackening surfaces.

BACKGROUND

Laser blackening of a surface may refer to the application of laser radiation to a surface to modify the surface so as to reduce the reflectivity of the surface, for example to reduce the reflectivity of the surface for visible light.

There is a growing interest in marking of metals, for example in the creative industries or for security/identification applications. Laser marking is used widely in the manufacture of automotive steels, medical glasses, smartphone materials etc to create either a black or white mark.

It is desired to provide improved or at least alternative methods for laser blackening of surfaces.

SUMMARY

In a first aspect of the invention there is provided a method of blackening a surface, comprising:
applying laser radiation to the surface to produce a periodic arrangement of structures on the surface, wherein
the laser radiation comprises pulsed laser radiation comprising a series of laser pulses and the power density of the pulses is in a range of 1 GW/cm² to 50 GW/cm² or 0.1 TW/cm² to 3 TW/cm², optionally in a range of 2 GW/cm² to 50 GW/cm².

The use of such power densities may change the reflectivity or emissivity of the surface at visible or infrared wavelengths. The blackening may be at visible or infrared wavelengths, or at other suitable wavelengths of electromagnetic radiation. Optionally at least some of the pulses may be interleaved with lower power laser pulses.

Optionally the power density may be in a range 1 GW/cm² to 45 GW/cm² or 0.1 TW/cm² to 2 TW/cm², optionally in a range 2 GW/cm² to 30 GW/cm² or 0.3 TW/cm² to 2 TW/cm², optionally in a range 4 GW/cm² to 10 GW/cm² or 0.4 TW/cm² to 1.5 TW/cm², further optionally in a range 0.38 TW/cm² to 0.6 TW/cm², 0.16 TW/cm² to 0.54 TW/cm².

By using laser pulses having such power densities, a periodic arrangement of structures that provides a surface with desired properties may be obtained. For example a surface having a desired value or range of values of emissivity or reflectivity, or a desired blackening, at a wavelength or range of wavelengths of interest may be obtained.

The laser pulses may have a duration less than a thermal relaxation time of the material of the surface. Alternatively the laser pulses may have a duration larger than the thermal relaxation time. The laser pulses may have a duration such that the electrons and the atomic lattice of the material of the surface have a substantially different temperature substantially throughout application of the laser pulses. The laser pulses may have a duration such that material of the surface is at least one of evaporated or vaporised or removed without substantial melting and/or flowing of the surface. The laser pulses may have a duration such that some material of the surface is at least one of evaporated or vaporised or removed without substantial melting and/or flowing of the remaining material of the surface.

A pulse duration of the laser pulses may be in a range 200 femtoseconds (fs) to 1000 picoseconds (ps) or may be in a range 1000 ps to 200 nanoseconds (ns).

The periodic arrangement of structures on the surface may comprise a periodic series of peaks and troughs substantially parallel to each other, and the peaks may be substantially flat on top and/or may be rounded on top and/or may have substantially no pointed and/or or sharp regions on top. The peaks may substantially have a top hat shape and/or a truncated pyramidal shape, for example a top hat shape and/or a truncated pyramidal shape in cross-sectional profile. Thus, for example, a desired value of electron work function and/or desired electron or photon trapping properties may be obtained. The peaks may extend in a longitudinal direction and may be referred to as ridges.

The peak to trough distance for at least some of the peaks, and/or an average or median peak to trough distance, may be in a range 500 nm to 500 μm, optionally in a range 500 nm to 100 μm, optionally in a range 100 μm to 500 μm, optionally in a range 5 μm to 100 μm, optionally in a range 20 μm to 80 μm, optionally in a range 1 μm to 60 μm, optionally in a range 30 μm to 60 μm.

The periodic arrangement of structures may comprise a cross-hatched arrangement or an arrangement of substantially parallel lines of peaks and troughs (for example, ridges and valleys) substantially without cross-hatching. The periodic arrangement of structures may, for example, be produced by a single pass of a laser source that provided the laser radiation.

The surface may be on an at least one underlying layer (for example, at least one of steel, stainless steel) and the laser radiation may be such as to substantially not remove or move material of the surface in such a way as to expose the underlying layer.

In a further aspect of the invention, which may be provided independently, there is provided a laser treated surface comprising a laser-formed periodic arrangement of structures on the surface, wherein at least one of:
the periodic arrangement of structures comprises a periodic series of peaks and troughs substantially parallel to each other;
the periodic arrangement of structures comprises a cross-hatched, periodic series of peaks and troughs; and optionally
the peaks may be substantially flat on top and/or may be rounded on top and/or may have substantially no pointed and/or or sharp regions on top and/or the peaks may substantially have a top hat shape and/or a truncated pyramidal shape, for example a top hat shape and/or a truncated pyramidal shape in cross-sectional profile; and/or
the peak to trough distance for at least some of the peaks, and/or an average or median peak to trough distance, may be in a range 500 nm to 500 μm, optionally in a range 500 nm to 100 μm, optionally in a range 100 μm to 500 μm, optionally in a range 5 μm to 100 μm, optionally in a range 20 µm to 80 µm, optionally in a range 1 µm to 60 µm, optionally in a range 30 µm to 60 µm.

In a further aspect of the invention, which may be provided independently, there is provided an apparatus for blackening a surface, comprising:

a laser source for applying pulsed laser radiation to a surface; and a laser controller configured to control the laser source to apply the laser radiation as a series of laser pulses thereby to form a periodic arrangement of structures on the surface, wherein the power density of the pulses is in a range of 1 GW/cm$^2$ to 50 GW/cm$^2$ or 0.1 TW/cm$^2$ to 3 TW/cm$^2$, optionally in a range of 2 GW/cm$^2$ to 50 GW/cm$^2$.

In a further aspect of the invention, there is provided a method of laser blackening a surface, comprising:

applying laser radiation to the surface to produce a periodic arrangement of structures on the surface, wherein the laser radiation comprises pulsed laser radiation comprising a series of laser pulses, and a pulse duration of the laser pulses is in a range 200 femtoseconds (fs) to 1000 picoseconds (ps) or may be in a range of 1000 ps to 200 nanosecond (ns).

The surface may be the surface of a target.

The pulse duration may be in a range 1 ps to 100 ps or 1 ns to 100 ns. The pulse duration may be in a range 1 ps to 50 ps or 1 ns to 100 ns. The pulse duration may be in a range 5 ps to 500 ps or 5 ns to 200 ns The laser radiation may comprise a pulsed laser beam that has a focal spot diameter on the surface in a range 1 µm to 50 µm or in a range 1 µm to 100 µm.

The pulsed radiation may have a pulse repetition rate in a range 10 kHz to 1 MHz.

An average power of the laser radiation may be in a range 0.3 W to 100 W, or in a range 0.3 W to 50 W, or in a range 0.3 W to 2 W, or in a range 1 W to 30 W, or in a range 1 W to 20 W, or in a range 1 W to 5 W, or in a range 0.1 W to 1 W, or in a range 0.1 W to 2 W, or in a range 0.3 W to 5 W.

The applying of the laser radiation to the surface may comprise scanning (for example, undirectionally or bidirectionally) a pulsed laser beam over the surface, and a scan speed for the scanning may be in a range 1 mm/s to 200 mm/s, optionally in a range 1 mm/s to 100 mm/s.

The scanning of the pulsed laser beam over the surface may be repeated between 2 and 20 times, or between 2 and 10 times, or may be performed once.

An angle of incidence of the laser radiation to the surface may be in a range from 0 to 30 degrees. The angle of incidence of the laser radiation to the surface may be in a range from 90 degree to 60 degrees.

A wavelength of the radiation may be in a range 100 nm to 2,000 nm, optionally 532 nm or 528 nm or 1030 nm or 1064 nm or 1070 nm.

The structures may comprise peaks and troughs. The periodic arrangement of structures may comprise a periodic series of peaks and troughs. The peaks and troughs may be substantially parallel to each other.

The periodic arrangement of structures may comprise a first series of peaks and troughs arranged in a first direction, and a second series of peaks and troughs arranged in a second, different direction. The first and second directions may be substantially orthogonal. The first series of peaks and troughs and the second series of peaks and troughs may intersect such that the periodic arrangement of structures comprises a cross-hatched arrangement.

A period of the periodic arrangement may be in a range 0.5 µm to 100 µm. The separation of adjacent peaks (or troughs) of the periodic structure may be in a range 0.5 µm to 100 µm. A hatch distance of the cross-hatched arrangement may be in a range 0.5 µm to 100 µm.

The surface may comprise or form part of a surface of, or a surface of a component of, for example, one or more of a computing device, an energy storage device, a communications device, a security device, a medical device, an identification device, a financial transaction device, an optical device, a storage device.

The method may comprise applying the laser radiation to the surface to produce a periodic arrangement of structures on the surface over a selected area. The selected area may comprise or represent one or more of an image, an identifier, a marker. The marker may comprise a security marker.

The method may comprise applying the laser radiation such as to produce the periodic arrangement of structures on the surface to form at least one of an image, an identifier, a marker, a security marker.

The laser radiation may be such that the applying of the laser radiation to the surface comprises producing further structures. The further structures may be smaller than the structures of the periodic arrangement of structures.

That feature may be particularly important, so in another aspect of the invention, which may be provided independently, there is provided a method of laser blackening a surface, comprising:

applying laser radiation to the surface to produce a periodic arrangement of structures on the surface, wherein the laser radiation comprises pulsed laser radiation comprising a series of laser pulses, and the laser radiation is such as to produce further structures on the surface as well as the periodic arrangement of structures.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 µm, optionally in a range 100 nm to 1 µm.

The further structures may cover at least part of the periodic array of structures. The further structures may be formed in the troughs and/or on the peaks of the periodic arrangement of structures.

The surface may be a metal surface. The surface and/or target may comprise copper, aluminium, stainless steel or titanium. The metal of the metal surface may be a metal selected from copper, aluminium, stainless steel, or titanium. The surface may form part of a laminated structure, for example a laminated target, for instance comprising one of copper, aluminium, stainless steel, titanium and at least one other material, and/or a laminated structure comprising at least two of copper, aluminium, stainless steel, titanium.

The surface may be the surface of a foil. The target may be a foil.

An average or peak fluence or other property of the laser radiation may be above an ablation threshold of the surface and within 100% to 300%, optionally 105%, optionally 102%, optionally 101% of the ablation threshold.

The radiation may be such as to at least partially melt the surface and/or to provide flow of material at the surface.

The pulses may be such that, for each pulse, a plasma is formed at the surface. The plasma may, for example, have substantially the same density as underlying material of the surface. The method may comprise applying the radiation using a solid-state laser, optionally the solid state laser comprises a Nd:YVO$_4$ or Nd:YAG or Yb:YAG or Nd:KGW or Nd:KYW or Yb:KGW or Yb:KYW laser, or a pulsed fibre laser, optionally a Yb, Tm or Nd pulsed fibre laser. The applied radiation may comprise the fundamental wavelengths of operation such lasers or their second or third harmonics.

In a further aspect of the invention, which may be provided independently, there is provided an apparatus for laser blackening a surface, comprising:
a laser source for applying pulsed laser radiation to a surface; and
a laser controller configured to control the laser source to apply the laser radiation as a series of laser pulses having a pulse duration in a range 200 femtoseconds (fs) to 1000 ps, so to produce a periodic arrangement of structures on the surface.

In another aspect of the invention, which may be provided independently there is provided a laser treated surface comprising a periodic arrangement of structures on the surface formed using a method according to any other aspect.

In a further aspect of the invention, which may be provided independently, there is provided a laser treated surface comprising a laser-formed periodic arrangement of structures on the surface and further laser-formed structures on the surface.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 μm, optionally in a range 100 nm to 1 μm.

The structures may comprise peaks and troughs. The periodic arrangement of structures may comprise a periodic series of peaks and troughs. The peaks and troughs may be substantially parallel to each other.

The periodic arrangement of structures may comprise a first series of peaks and troughs arranged in a first direction, and a second series of peaks and troughs arranged in a second, different direction. The first and second directions may be substantially orthogonal. The first series of peaks and troughs and the second series of peaks and troughs may intersect such that the periodic arrangement of structures comprises a cross-hatched arrangement.

A period of the periodic arrangement may be in a range 0.5 μm to 100 μm or may be in a range 100 μm to 500 μm. The separation of adjacent peaks (or troughs) of the periodic structure may be in a range 0.5 μm to 100 μm. A hatch distance of the cross-hatched arrangement may be in a range 0.5 μm to 100 μm.

The further structures may comprise further periodic structures. The further structures may comprise ripples. The further structures may comprise nano-ripples. The further structures may be further periodic structures. The further structures may comprise laser induced periodic surface structures (LIPPS). The further structures may have a periodicity in a range 10 nm to 1 μm, optionally in a range 100 nm to 1 μm.

The further structures may cover at least part of the periodic array of structures. The further structures may be formed in the troughs of the periodic arrangement of structures.

The surface may comprise or form part of a surface of, or a surface of a component of, for example, one or more of a computing device, a communications device, a security device, a medical device, an identification device, a financial transaction device, an optical device, a storage device.

The periodic arrangement of structures may be arranged on the surface over a selected area. The selected area may comprise or represent one or more of an image, an identifier, a marker. The marker may comprise a security marker.

The surface may be a metal surface. The surface may comprise copper, aluminium, stainless steel or titanium. The metal of the metal surface may be selected from copper, aluminium, stainless steel, titanium. The surface may form part of a laminated structure, for example a laminated target, for instance comprising one of copper, aluminium, stainless steel, titanium and at least one other material, and/or a laminated structure comprising at least two of copper, aluminium, stainless steel, titanium.

In another aspect of the invention, which may be provided independently, there is provided a computing device, an energy storage device, a communications device, a security device, a medical device, an identification device, a financial transaction device, an optical device, a storage device that includes a surface according to any other suitable aspect of the invention.

There is also provided a computing device, a communications device, a security device, a medical device, an identification device, a financial transaction device, an optical device, or a storage device comprising a surface including an image, an identifier, a marker, a security marker formed using a method as claimed or described herein.

In further aspects of the invention there are provided a method, a surface, a structure comprising a surface, an apparatus, a component, a computing device, a communications device, a security device, a medical device, an identification device, a financial transaction device, an optical device, or a storage device as described and/or illustrated herein.

Any feature in any one aspect of the invention may be applied to any other one or more of the aspects of the invention in any appropriate combination.

BRIEF DESCRIPTION OF THE DRAWINGS

Embodiments of the invention are further described hereinafter with reference to the accompanying drawings, in which.

DETAILED DESCRIPTION

Figure 1:
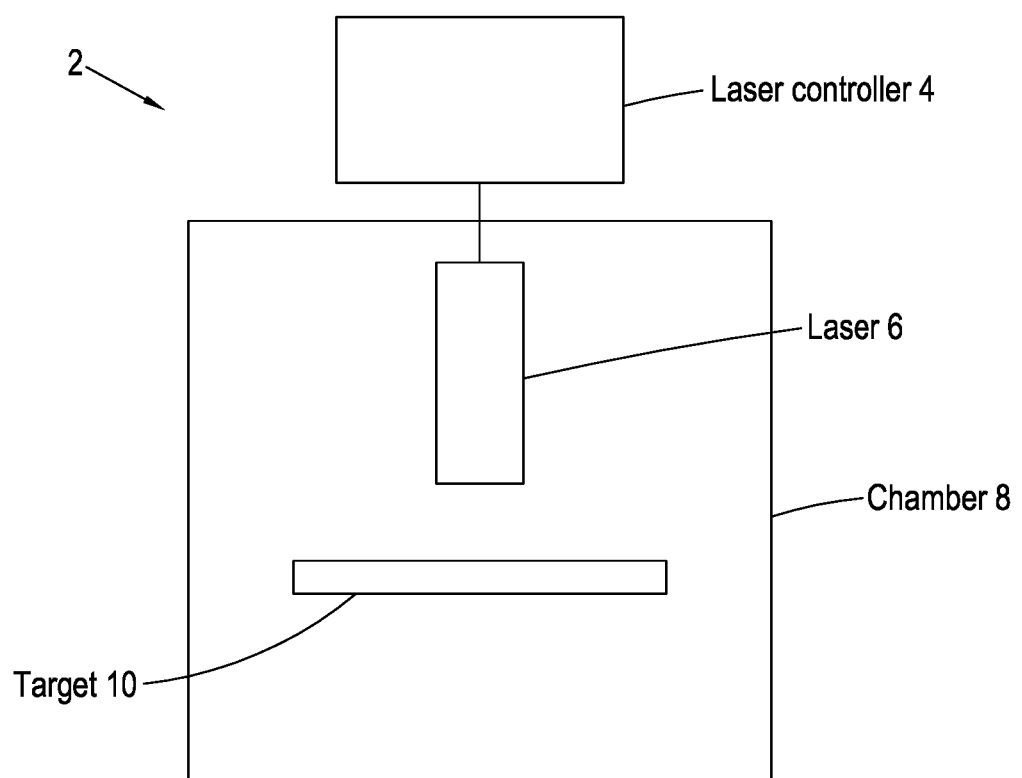
FIG. 1 is a schematic diagram of a system used for laser treatment of a surface to laser blacken the surface.

FIG. 1 shows a system used for laser treatment of a surface to laser blacken the surface.

The system 2 of FIG. 1 comprises a laser 6 connected to a laser controller 4 which is used to control operation of the laser 6 to emit a pulsed laser radiation beam of desired characteristics. The laser 6 is aligned with a target 10 such that operation of the laser 6 under control of the laser controller 4 forms periodic structures on the surface of the target.

In embodiments, the laser may be one of a $Nd:YVO_4$ or Nd:YAG or Yb:YAG or Nd:KGW or Nd:KYW or Yb:KGW or Yb:KYW laser and the main operating wavelength or one of the second or third harmonics may be used. Alternatively the laser may be a pulsed fibre laser, for example a Yb, Tm or Nd pulsed fibre laser, and the main operating wavelength or one of the second or third harmonics may be used. Any other suitable laser may be used in alternative embodiments. In the embodiment of FIG. 1, the wavelength of the pulsed laser radiation is 532 nm, but any other suitable wavelength can be used in other embodiments, for example 528 nm or 1030 m or 1064 nm or 1070 nm.

The controller may comprise a dedicated controller, or a suitably programmed computer. The controller may be implemented in software, hardware or any suitable combination of hardware and software. In some embodiments, the controller may comprise more ASICs (application specific integrated circuits) or FPGAs (field programmable gate arrays) or other suitable circuitry.

In the embodiment of FIG. 1, the target 10 and laser 6 are located in air and the laser treatment of the surface is performed in air. The target 10 and laser 6 may be positioned in a sealable and/or pumpable chamber 8 that has an associated pump and/or gas supply, and the laser processing of the surface may be performed in vacuum or in desired gaseous conditions, for example in the presence of a selected reactive gas. The chamber 8 is omitted in some embodiments.

In the embodiment of FIG. 1, the target is a metal target comprising copper. Other targets, for example aluminium, stainless steel or titanium can be used.

In operation pulsed laser radiation of desired characteristics is scanned across the surface of the target 10 by the laser 6 under control of the laser controller 4 to produce a periodic arrangement of structures on the surface. For example, in order to form peaks and troughs arranged in parallel rows, the laser beam may be scanned along parallel, spaced-apart paths across the surface to form parallel troughs separated by peaks. Any other suitable arrangements of structures can be formed by suitable scanning of the laser beam over the surface. The laser can be controlled to form the structures over a desired area. The desired area may comprise or represent, for example, one or more of an image, an identifier, a marker. The marker may, for instance, comprise a security marker.

Operating parameters of the laser, and certain equations linking such parameters, can be represented as follows,
Wavelength ($\lambda$) [m]
Repetition rate of the laser ($\gamma$) [Hz]
Pulse length of the laser ($\tau$) [s]
Average power of the laser (Pavg) [W]—represents the energy flow over one period t
Energy per pulse (Ep) [J]
Fluence of the laser (F) [J/cm$^2$]
Beam spot radius on the target (r) [m]
Beam spot area on the target ($A=\pi r^2$) [m$^2$]
Number of times surface of the target was scanned by the laser beam (N) dimensionless
Speed at which surface of the target was scanned by the laser beam (V) [m/s]
Number of pulses fired per each spot on the surface of the target (n) [dimensionless]
Time interval between the pulses—one period (t) [s]
Peak Power ($P_{peak}$) [W]—defines the energy flow within a single pulse
Power density or Intensity (I) [W/cm$^2$]
Equations $$t = \frac{1}{\gamma}$$

$$n = \frac{(2r)\gamma}{V}$$

$$E_p = \frac{P_{avg}}{\gamma}$$

$$F = \frac{E_{pulse}}{A}$$

$$P_{peak} = \frac{E_{pulse}}{\tau}$$

$$I = \frac{P_{peak}}{A}$$

Suitable operating parameters can be selected, for example based on the equations and representations above, to obtain pulsed laser radiation of desired properties, for example a desired power density of the pulses.

Table 1 provides operating parameters of the laser to produce a desired periodic arrangement of structures on the surface, for an embodiment where the surface is copper. Three sets of operating parameters according to an embodiment are provided in table 1. The laser processing of the surface is performed in air in this case.

TABLE 1

| | | | | Copper | | | | |
|---|---|---|---|---|---|---|---|---|
| Wavelength, nm | Pulse Width Range | Focal Spot Diameter on the target, μm | Rep. Rate of the laser, kHz | Average Power, W | Scan Speed, mm/s | Repetition Number of the scans | Hatch Distance, μm | Fluence, J/cm$^2$ (Number of pulses per spot) |
| 532 | ~10 ps | 12 | 200 | 0.94 (range between 0.77 to 1.00) | 10 | 1 | 24 | 4.16 (240) |
| 532 | ~10 ps | 40 | 200 | 0.75 | 10 | 1 | 30 | 0.3 (800) |
| 1064 | ~10 ps | 73 | 200 | 3.27 | 30 | 1 | 55 | 0.39 (487) |

In some other embodiments where the target is copper, operating parameters are selected as follows:

a) Wavelength of 532 nm; Pulse width of the laser: from 200 femtosecond to 200 picosecond; Focal spot diameter on the target: from 1 µm to 50 µm; Repetition rate of the laser from 10 kHz to 1 MHz; Average power from 0.3 W to 2 W; Scan speeds of 1 mm/s to 100 mm/s; Repetition number of scans from 1 to 10; Hatch Distance from 0.5 µm to 100 µm; angle of incidence of the laser beam from 0 to 30 degrees.

b) Wavelength of 1064 nm; Pulse width of the laser: from 200 femtosecond to 200 picosecond; Focal spot diameter on the target: from 1 µm to 50 µm; Repetition rate of the laser from 10 kHz to 1 MHz; Average power from 1 W to 5 W; Scan speeds of 1 mm/s to 100 mm/s; Repetition number of scans from 1 to 10; Hatch Distance from 0.5 µm to 100 µm; angle of incidence of the laser beam from 0 to 30 degrees.

Table 2 provides operating parameters of the laser to produce a desired periodic arrangement of structures on the surface, for an embodiment where the surface is aluminium.

TABLE 2

Aluminium

| Wavelength, nm | Pulse Width Range | Focal Spot Diameter on the target, µm | Rep. Rate of the laser, kHz | Average Power, W | Scan Speed, mm/s | Repetition Number of the scans | Hatch Distance, µm | Fluence, J/cm² (Number of pulses per spot) |
|---|---|---|---|---|---|---|---|---|
| 1064 | ~10 ps | 12 | 200 | 0.21 | 10 | 1 | 20 | 0.93 (240) |

In some other embodiments where the target is aluminium, operating parameters are selected as follows:

a) Wavelength of 1064 nm; Pulse width of the laser: from 200 femtosecond to 200 picosecond; Focal spot diameter on the target: from 1 µm to 50 µm; Repetition rate of the laser from 10 kHz to 1 MHz; Average power from 0.1 W to 1 W; Scan speeds of 1 mm/s to 100 mm/s; Repetition number of scans from 1 to 10; Hatch Distance from 0.5 µm to 100 µm; angle of incidence of the laser beam from 0 to 30 degrees.

Table 3 provides operating parameters of the laser to produce a desired periodic arrangement of structures on the surface, for an embodiment where the surface is stainless steel.

TABLE 3

Stainless steel

| Wavelength, nm | Pulse Width Range | Focal Spot Diameter on the target, µm | Rep. Rate of the laser, kHz | Average Power, W | Scan Speed, mm/s | Repetition Number of the scans | Hatch Distance, µm | Fluence, J/cm² (Number of pulses per spot) |
|---|---|---|---|---|---|---|---|---|
| 532 | ~10 ps | 12 | 200 | 0.44 | 10 | 1 | 24 | 1.95 (240) |

In some other embodiments where the target is stainless steel, operating parameters are selected as follows:

a) Wavelength of 532 nm; Pulse width of the laser: from 200 femtosecond to 200 picosecond; Focal spot diameter on the target: from 1 µm to 50 µm; Repetition rate of the laser from 10 kHz to 1 MHz; Average power from 0.1 W to 2 W; Scan speeds of 1 mm/s to 100 mm/s; Repetition number of scans from 1 to 10; Hatch Distance from 0.5 µm to 100 µm.

b) Wavelength of 1064 nm; Pulse width of the laser: from 200 femtosecond to 200 picosecond; Focal spot diameter on the target: from 1 µm to 50 µm; Repetition rate of the laser from 10 kHz to 1 MHz; Average power from 1 W to 5 W; Scan speeds of 1 mm/s to 100 mm/s; Repetition number of scans from 1 to 10; Hatch Distance from 0.5 µm to 100 µm; angle of incidence of the laser beam from 0 to 30 degrees.

The power density (intensity) used for stainless steel may be selected to be in a range from 0.01 TW/cm² to 1 TW/cm², for example by suitable choice of wavelength and of other operating parameters such as those recited in paragraphs a) or b) above.

Figure 2:
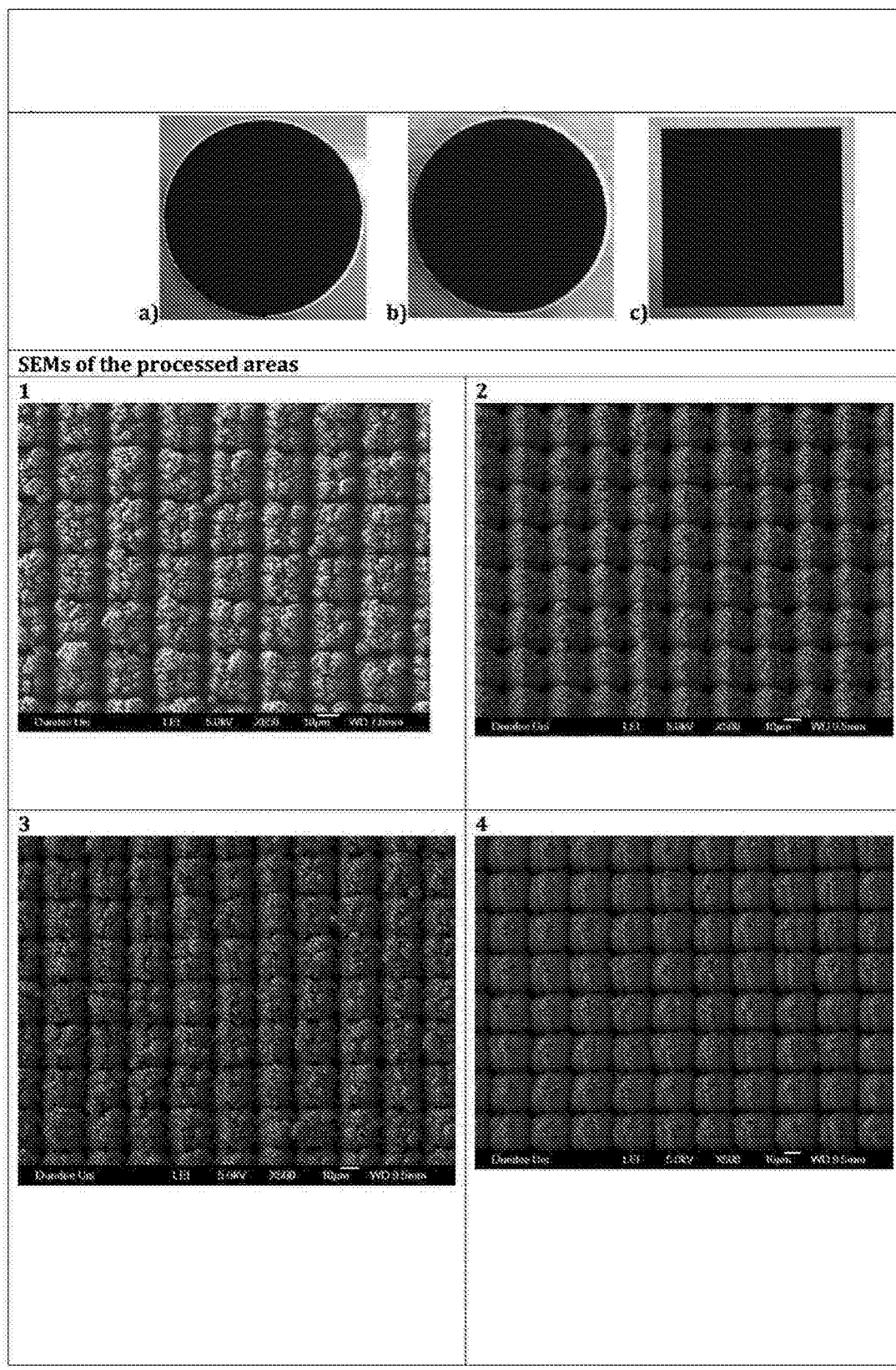
FIG. 2 shows images of copper samples following laser treatment to form periodic structures on the surfaces of the samples.

FIG. 2 shows images of copper samples following laser treatment to form periodic structures on the surfaces of the samples as described in relation to FIG. 1. The operating parameters used in the laser treatment of the copper samples are provided in the following table, Table 4. Three samples were treated, copper samples a), b) and c). Images of the samples a), b) and c), and four scanning electron microscope (SEM) images of the processed surfaces of samples, labelled 1 to 4, are shown in FIG. 2 and described in Table 4 below.

Figure 3:
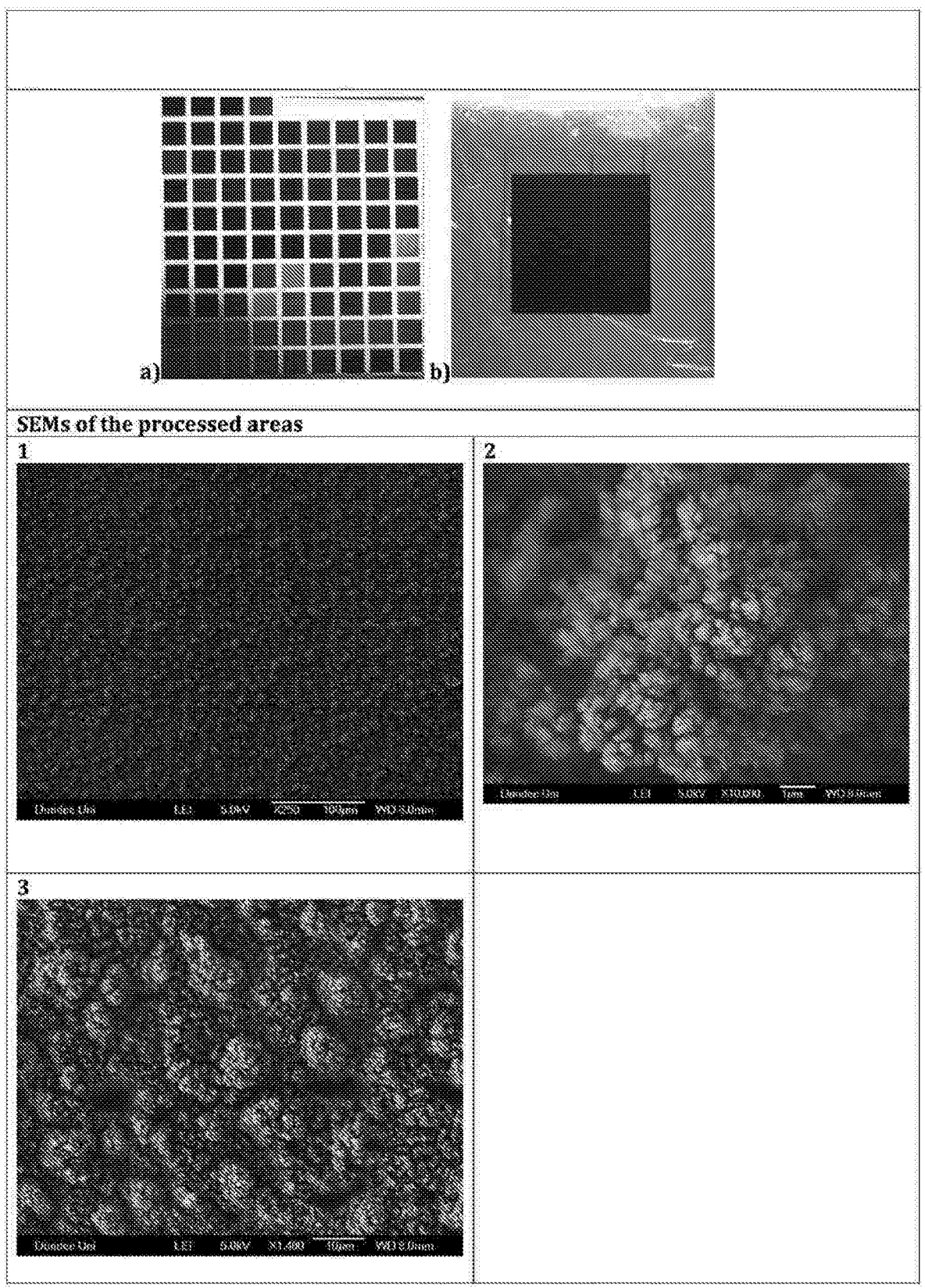
FIG. 3 shows images of aluminium samples following laser treatment to form periodic structures on the surfaces of the samples.

FIG. 3 shows images of aluminium samples following laser treatment to form periodic structures on the surface as described in relation to FIG. 1. The operating parameters used in the laser treatment of the aluminium samples are provided in the following table, Table 5. Two samples were treated, aluminium samples a) and b). Images of the samples a) and b) and three scanning electron microscope (SEM) images of the processed surface of a sample at different levels of magnification, labelled 1 to 3, are shown in the figure and described in Table 5 below.

TABLE 4

SEMs of the processed areas

| a) | b c) |
|---|---|
| 1<br>Wavelength = 532 nm; Pulse length 10 ps; Focal spot diameter on the target = 12 micrometres; Rep. rate of the laser = 200 kHz; Average power = 0.81 W; Scan speed = 10 mm/s; Single scan over the surface; Hatch distance between the lines = 24 micrometres; Number of pulses fired per spot = 240 | 2<br>Wavelength = 532 nm; Pulse length 10 ps; Focal spot diameter on the target = 12 micrometres; Rep. rate of the laser = 200 kHz; Average power = 0.95 W; Scan speed = 10 mm/s; Single scan over the surface; Hatch distance between the lines = 24 micrometres; Number of pulses fired per spot = 240 |
| 3<br>Wavelength = 532 nm; Pulse length 10 ps; Focal spot diameter on the target = 12 micrometres; Rep. rate of the laser = 200 kHz; Average power = 0.77 W; Scan speed = 10 mm/s; Single scan over the surface; Hatch distance between the lines = 24 micrometres; Number of pulses fired per spot = 240 | 4<br>Wavelength = 532 nm; Pulse length 10 ps; Focal spot diameter on the target = 12 micrometres; Rep. rate of the laser = 200 kHz; Average power = 0.90 W; Scan speed = 10 mm/s; Single scan over the surface; Hatch distance between the lines = 24 micrometres; Number of pulses fired per spot = 240 |
| 5, 6, 7, 8, 9 and 10 are all the similar parameters but only with different average powers within the range given in the parameters data. | 6 |
| 7 | 8 |
| 9 | 10 |

Samples:
a) Cu OFE disk, ø 29 mm, thickness 1 mm -processed area of about ø 28 mm.
b) Cu OFE disk, ø 13 mm, thickness 1 mm -processed area of about ø 12 mm.
c) Cu OFE substrate, 20 × 20 mm, thickness 1 mm -processed area of 15 × 15 mm.

TABLE 5

SEMs of the processed areas

| a) b) | |
|---|---|
| 1<br>Wavelength = 1064 nm; Pulse length 10 ps; Focal spot diameter on the target = 12 micrometres; Rep. rate of the laser = 200 kHz; Average power = 0.21 W; Scan speed = 10 mm/s; Single scan over the surface; Hatch distance between the lines = 20 micrometres; Number of pulses fired per spot = 240 | 2<br>The same parameters as in image 1. It is a higher magnification (10000) of the image presented in 1. |
| 3<br>The same as one. It is a higher magnification (1400) of the image presented in 1. The parameters are the same. | |

Samples:
a) Aluminium, 25 × 25 mm, thickness 1 mm -processed area of about 20 × 20 mm.
b) Aluminium, thickness 1 mm -processed area of about 5 × 5 mm.

Figure 4A:
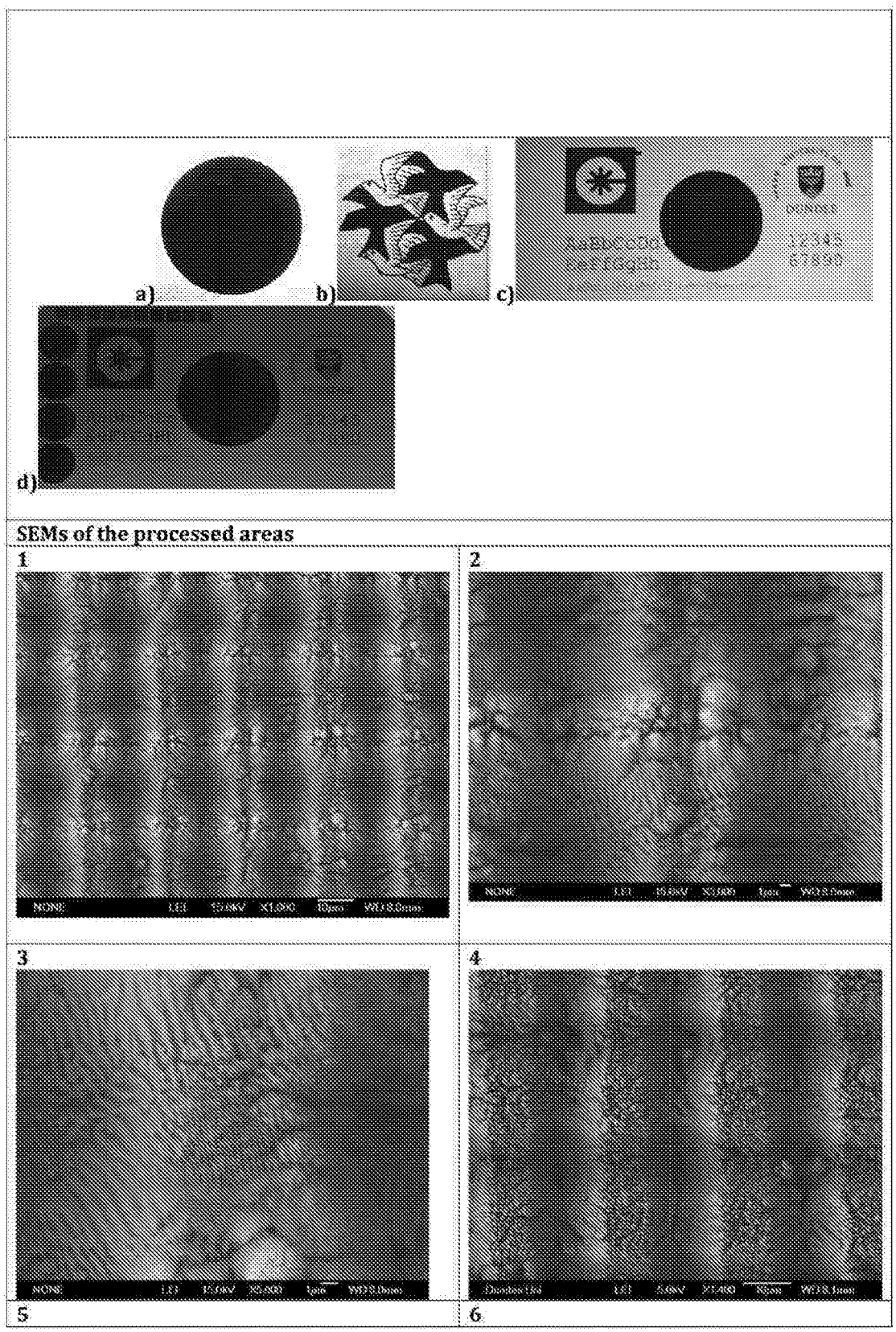
FIGS. 4a and 4b show images of stainless steel samples following laser treatment to form periodic structures on the surfaces of the samples.
Figure 4B:
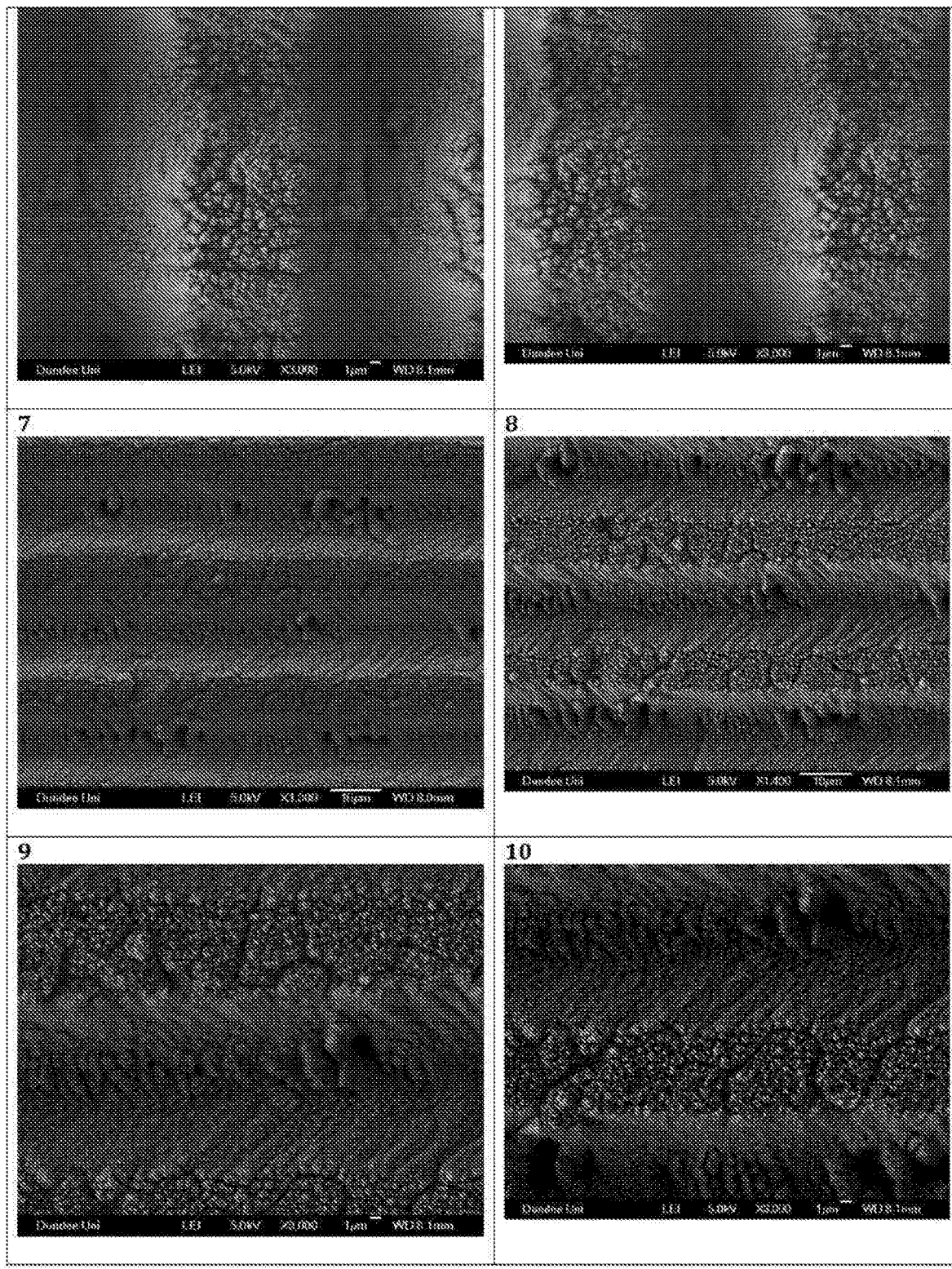

FIGS. 4a and 4b shows images of stainless steel samples following laser treatment to form periodic structures on the surface as described in relation to FIG. 1. The operating parameters used in the laser treatment of the samples are provided in the following tables, Tables 6a and 6b. Four samples were treated, stainless steel samples a), b), c) and d). Images of the samples a), b), c) and d) and scanning electron microscope (SEM) images of the processed surfaces of the samples, labelled 1 to 10, are shown in FIGS. 4a and 4b and described in Tables 6a and 6b below.

TABLE 6a

SEMs of the processed areas

| a) b) c) d) | |
|---|---|
| 1<br>Wavelength = 532 nm; Pulse length 10 ps; Focal spot diameter on the target = 12 micrometres; Rep. rate of the laser = 200 kHz; Average power = 0.44 W; Scan speed = 10 mm/s; Single scan over the surface; Hatch distance between the lines = 24 micrometres; Number of pulses fired per spot = 240 | 2<br>The same parameters as in image 1. It is a higher magnification (3000) of the image presented in 1. |

TABLE 6a-continued

SEMs of the processed areas a) b) c) d)

| | |
|---|---|
| 3 | 4 |
| The same parameters as in image 1. It is a higher magnification (5000) of the image presented in 1. | Wavelength = 1064 nm: Pulse length 20 ps; Focal spot diameter on the target = 15 micrometres; Rep. rate of the laser = 200 kHz; Average power = 0.8 W; Scan speed = 10 mm/s; Single scan over the surface; Hatch distance between the lines = 24 micrometres; Number of pulses fired per spot = 300 |
| 5 | 6 |
| The same parameters as in image 4. It is a higher magnification (3000) of the image presented in 1. | The same parameters as in image 4. It is a higher magnification (3000) of the image presented in 1. |
| 7 | 8 |
| Example of linear scan. Wavelength = 532 nm; Pulse length 10 ps; Focal spot diameter on the target = 12 micrometres; Rep. rate of the laser = 200 kHz; Average power = 0.44 W; Scan speed = 10 mm/s: Single scan over the surface; Hatch distance between the lines = 24 micrometres; Number of pulses fired per spot = 240 | Example of linear scan. Wavelength = 1064 nm; Pulse length 20 ps; Focal spot diameter on the target = 15 micrometres; Rep. rate of the laser = 200 kHz; Average power = 0.8 W; Scan speed = 10 mm/s; Single scan over the surface; Hatch distance between the lines = 24 micrometres; Number of pulses fired per spot = 300 |

Samples:
a) Stainless Steel, 20 × 20 mm, thickness 200 μm -processed area of about ø 18 mm.
b) Stainless Steel, thickness 1 mm -processed area of about 20 × 20 mm.
c&d) Stainless Steel (not polished (c), polished (d)), thickness 1 mm, various processed areas.

TABLE 6b

| 9 | 10 |
|---|---|
| The same parameters as in image 8. It is a higher magnification (3000) of the image presented in 1. | The same parameters as in image 8. It is a higher magnification (3000) of the image presented in 1. |

In a further embodiment, stainless steel samples were laser processed by the apparatus of FIG. 1 in accordance with the operating parameters provided in Table 7 below,

TABLE 7

| | Name | | | | |
|---|---|---|---|---|---|
| | SE2c PS10HDS | SE3c PS15HDS | SE4c PS15HD+ | SE5c NSHS | SE6c NSPS |
| λ [nm] | 532 | 532 | 532 | 1064 | 1064 |
| τ [s] | 10p | 10p | 10p | 10n | 10n |
| Rep rate [kHz] | 200 | 200 | 200 | 20 | 20 |
| Power setting | 93% att | 93% att | 93% att | 40% | 38% |
| Power [W] | 0.2 | 0.2 | 0.2 | 2.7 | 3.1 |
| Spot Ø [μm] | 12 | 12 | 12 | 60 | 60 |
| Pulse energy [μJ] | 1.00 | 1.00 | 1.00 | 135.00 | 155.00 |
| Fluence [J/cm$^2$] | 0.88 | 0.88 | 0.88 | 4.77 | 5.48 |
| Structure [cross, line] | cross | cross | cross | cross | cross |
| Hatch Distance [μm] | 10 | 15 | 20 | 50 | 75 |
| Scan speed [mm/s] | 10 | 10 | 10 | 10 | 10 |
| Passes | 1 | 1 | 1 | 1 | 10 |
| Pulses/spot/pass | 240 | 240 | 240 | 120 | 120 |

The samples were referred to by the references PS10HDS (picosecond pulsed laser treatment), PS15HDS (picosecond pulsed laser treatment), PS15HD+ (picosecond pulsed laser treatment), NSHS (nanosecond pulsed laser treatment providing fluence of 4.8 GW/cm$^2$), and NSPS (nanosecond pulsed laser treatment providing fluence of 5.5 GW/cm$^2$). The samples were samples of 316LN steel that were laser-processed using the parameters as set out in the table.

A further stainless steel sample referred to as NSHSD was also processed. The same processing parameters were used for the NSHSD sample as for the NSHS sample, as provided in Tables 7 and 8, except that the laser writing was unidirectional rather than bidirectional. In an example of bidirectional writing the laser writes a line from (say) left to right and then the next line is from right to left. In an example of unidirectional writing the laser writes a line from, say, left to right and then the next line is also from left to right. Further parameters for the NSPS, NSHS and NSHSD samples are provided in Table 8 below.

TABLE 8

| | Name | | |
|---|---|---|---|
| | NSPS | NSHS | NSHSD |
| λ [nm] | 1064 | 1064 | |
| τ [s] | 10n | 10n | |
| Rep rate [kHz] | 20 | 20 | |
| Power setting | 38% | 40% | |
| Power [W] | 2.7 | 3.1 | |
| Spot Ø [μm] | 60 | 60 | |
| Pulse energy [μJ] | 135.00 | 155.00 | |
| Fluence [J/cm$^2$] | 4.77 | 5.48 | |
| Structure [cross, line] | cross | cross | |
| Writing direction | bidirectional | bidirectional | unidirectional |
| Hatch Distance [μm] | 75 | 50 | |
| Scan speed [mm/s] | 10 | 10 | |
| Passes | 10 | 1 | |
| Pulses/spot/pass | 120 | 120 | |
| area width [mm] | 12000 | 12000 | |
| area height [mm] | 1000 | 1000 | |
| Process time [min] | 5333333.33 | 800000.00 | |
| [d] | 3703.703704 | 555.555556 | |

Each of the PS10HDS, PS15HDS, PS15HD+, NSHS, NSPS, and NSHD samples were of diameter 20 mm, and emissivity measurements were performed on the samples. The samples were stored in silk paper in a plastic box prior to the measurements being performed. Emissivity measurements were also performed on two stainless steel samples (of stainless steel type 304LN and 316LN) referred to as the 304LN and 316LN samples, that were not subject to laser processing and were used as reference samples.

Figure 5:
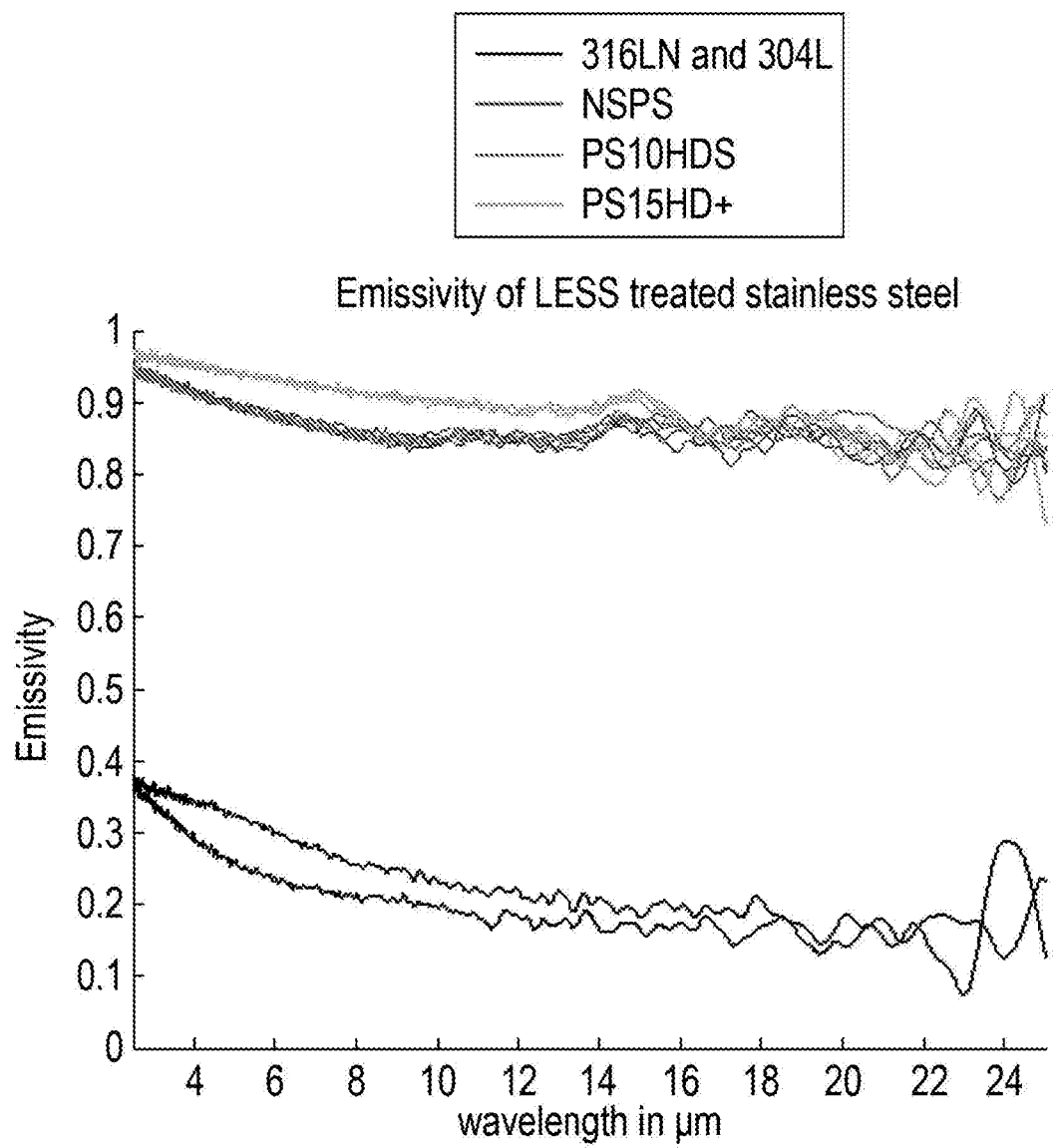
FIGS. 5 and 6 are plots of emissivity as a function of wavelength for stainless steel samples following laser treatment to form periodic structures on the surfaces of the samples (demonstrating emissivity >0.9 for wavelengths up to 30 μm, and for stainless steel reference samples (emissivity less than 0.4)

The emissivity of the samples was measured using infrared light with wavelength from 2.5 µm to 25 µm. Each sample was measured several times turning it randomly to measure at different incidence angles (incident light in respect to the laser structure). FIG. 5 presents emissivity measurement data for the NSHSD, NSHS and NSPS samples. The non-laser-processed 316LN and 304L reference samples are also shown for comparison.

The bottom two lines plotted on the graph of FIG. 5 represents the results of the emissivity measurements performed on the two untreated reference samples (the 304L and 316LN samples). The other lines represent measured emissivity as a function of wavelength for the laser treated NSHSD, NSHS and NSPS samples. More than one line is plotted for each of the NSHSD, NSHS and NSPS samples, representing measurements with different incident angles between incoming light and laser structures.

As can be seen from FIG. 5, the measured emissivities for the NSHSD and NSHS samples are slightly lower compared to the measured emissivity for the NSPS sample at wavelengths shorter than 16 µm. The measured emissivities do not depend on the angle of the incoming light with respect to the periodic structures formed by the laser processing. The NSPS sample has the highest emissivity for wavelengths shorter than 16 µm.

Figure 6:
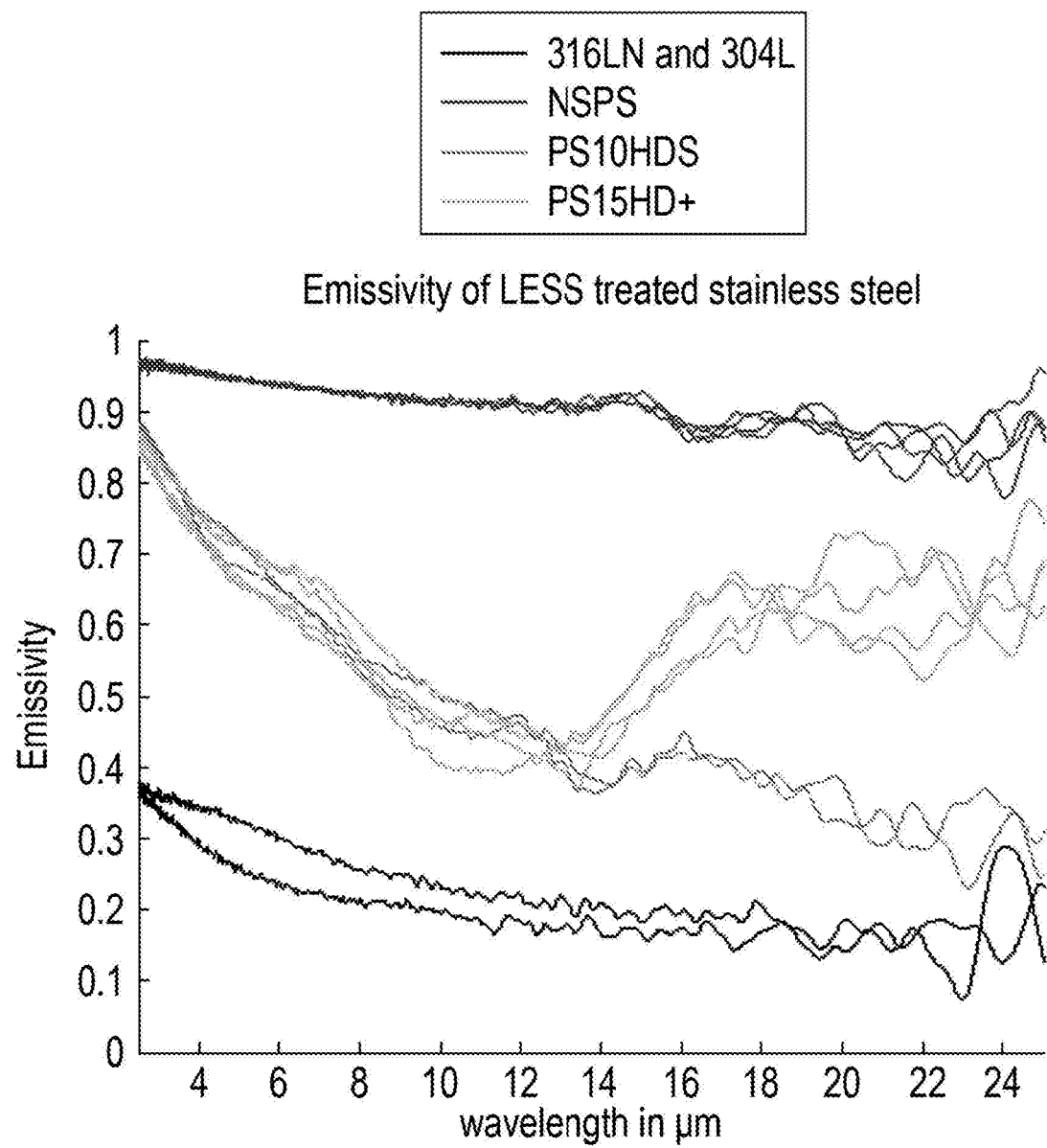

Results of emissivity measurements for the PS10HDS and PSA5HD+ samples are shown in FIG. 6, together with the results for the NSPS sample and for the two non-laser-processed reference samples (316LN and 304L). The bottom two lines plotted on the graph of FIG. 6 represents the results of the emissivity measurements performed on the two untreated reference samples (the 304L and 316LN samples). The top group of lines represent results (also plotted in FIG. 5) for the NSPS sample, representing measurements with different incident angles between incoming light and laser structures. The other two groups of lines represent measurements for the PS10HDS and PS15HD+ samples, the different lines in the groups representing measurements with different incident angles.

As can be seen from FIG. 6, the three different surface treatments (for the PS10HDS, PSA5HD+ and NSPS samples) are well distinguishable based on the emissivity measurements as a function of wavelength. All three laser-processed samples that are the subject of FIG. 6 (the PS10HDS, PSA5HD+ and NSPS samples) show higher emissivities for all measured wavelengths than the non-laser-processed reference samples (304L and 316LN). Sample NSPS has the highest emissivity over the whole range.

Figure 7:
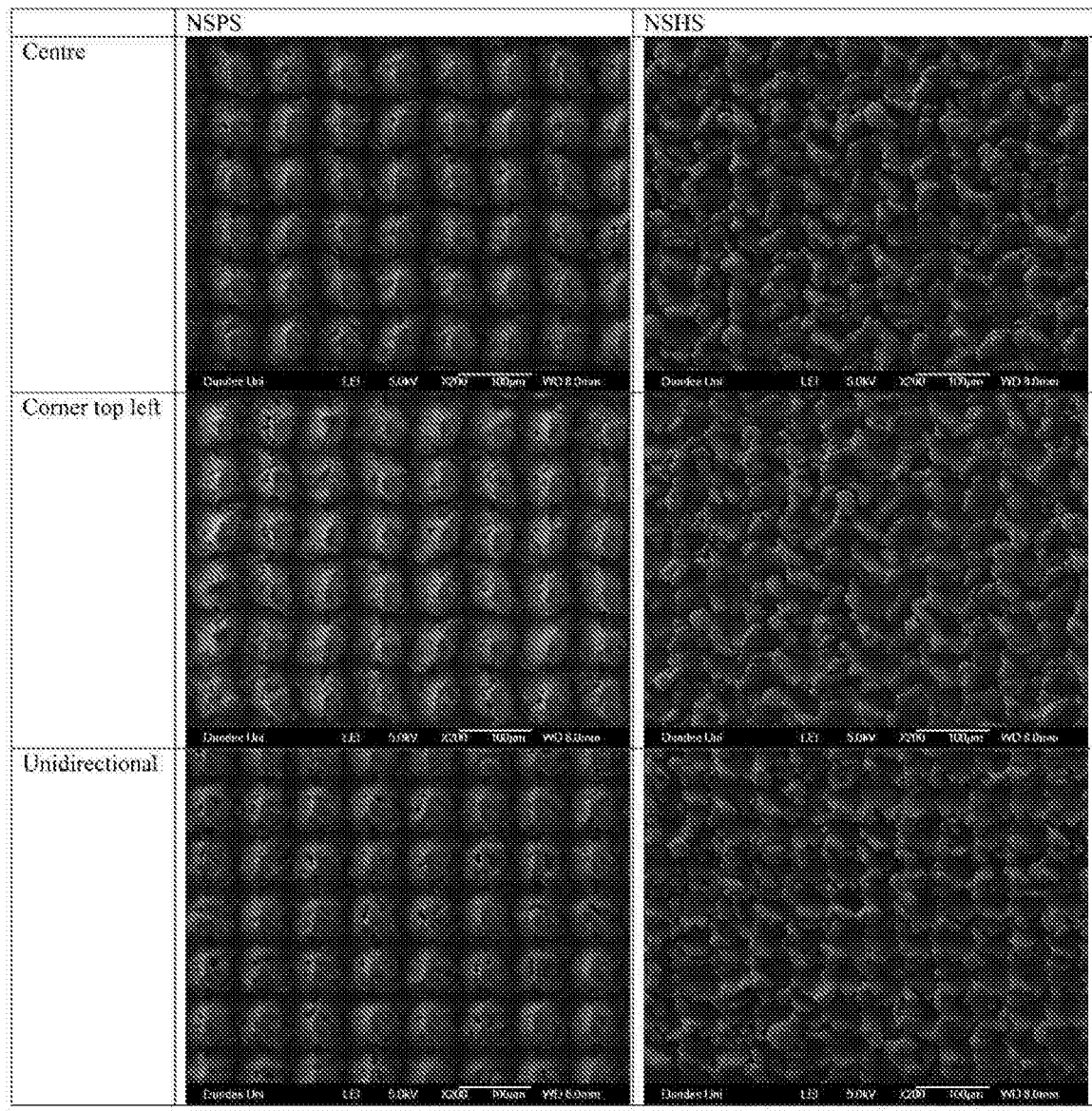
FIG. 7 shows SEM images of different positions on the surfaces of laser-processed stainless steel samples.

FIG. 7 shows SEM images of different positions on the surfaces of the laser-processed NSPS and NSHS samples. The processing parameters for the NSPS and NSHS samples were substantially the same except that the laser beam was scanned over the surface in a unidirectional fashion for the NSPS sample and in a bidirectional fashion for the NSHS sample.

Figure 8A:
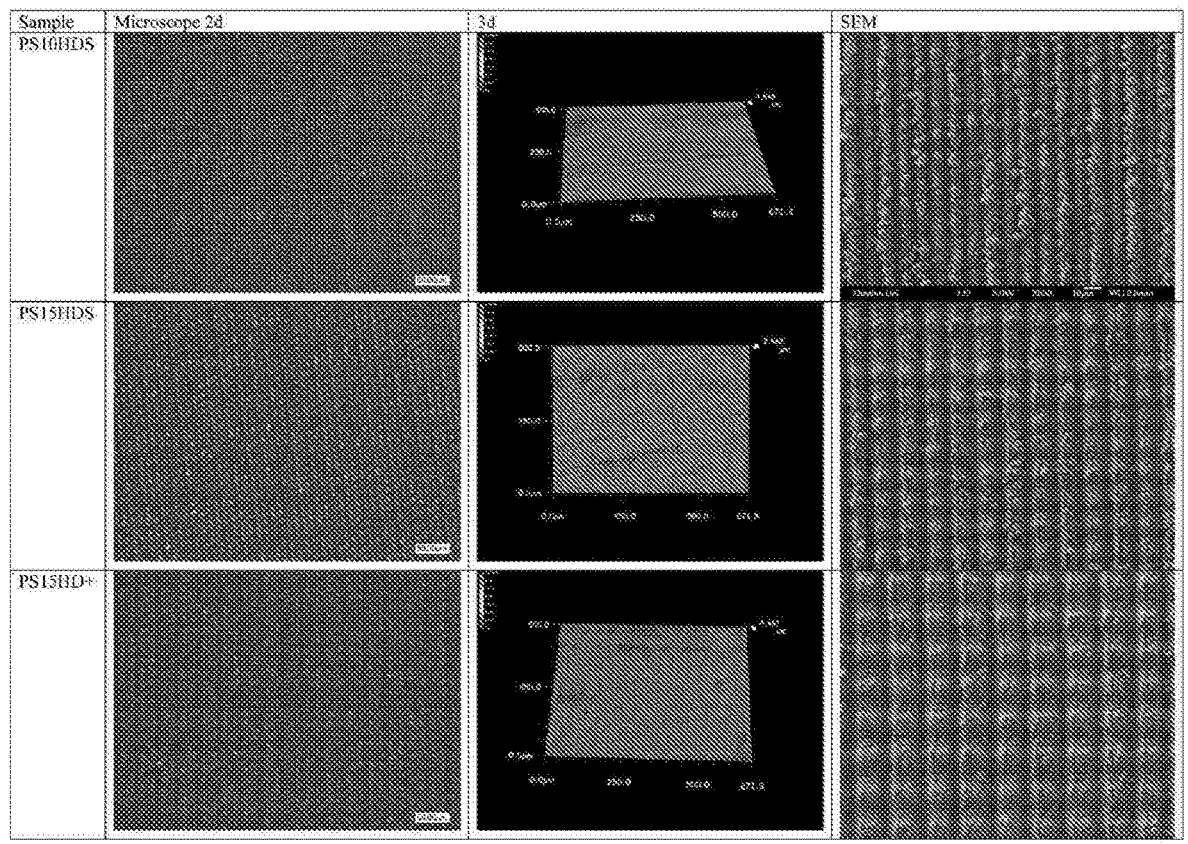
FIGS. 8a and 8b show 2d microscope images, 3d images and SEM images of the surfaces of laser-processed stainless steel samples.
Figure 8B:
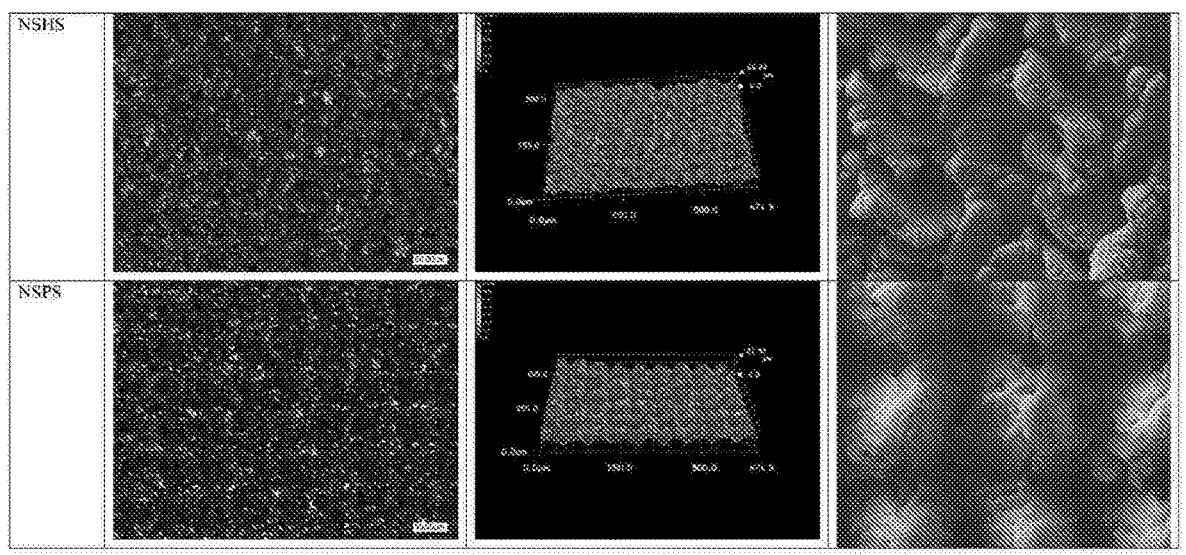

FIGS. 8a and 8b show 2d microscope images, 3d images and SEM images of the surfaces of the PS10HDS, PS15HDS, PS15HD+, NSHS and HSPS samples.

Figure 9:
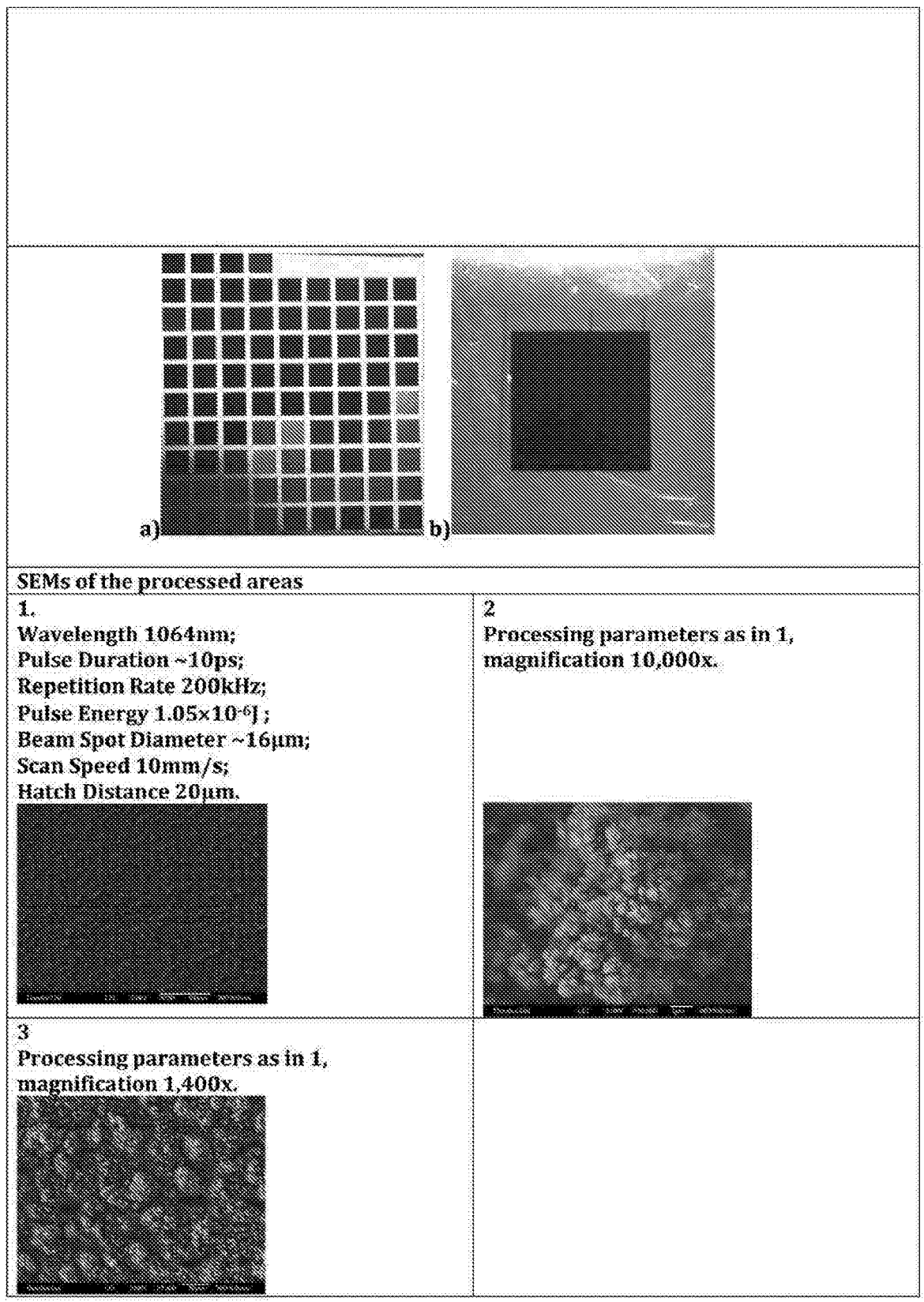
FIG. 9 shows images of laser-processed aluminium samples.

FIG. 9 shows images of laser-processed aluminium samples labelled a) and b).

Samples a) of FIG. 9 have a size 25 mm×25 mm, thickness 1 mm. The laser-processed areas were of area around 20 mm×20 mm. The various samples a) of FIG. 9 were laser processed to form periodic structures using the following parameters: wavelength 532 nm; pulse duration 10 ps; repetition rate 200 kHZ; pulse energy range from $0.75 \times 10^{-6}$ J to $29.8 \times 10^{-6}$ J; beam spot diameter approx. 12 µm; scan speed from 5 mm/s to 15 mm/s; hatch distance range from 8 to 24 µm.

Sample b) of FIG. 9 has a thickness of 1 mm and a laser-processed area of about 5 mm×5 mm. Sample b) of FIG. 9 was laser processed to form periodic structures using the following parameters: wavelength 1064 nm; pulse duration 10 ps; repetition rate 200 kHZ; pulse energy $1.05 \times 10^{-6}$ J; beam spot diameter 16 µm; scan speed 10 mm/s; hatch distance 20 µm.

SEM images of regions of the surface of sample b) are also shown in FIG. 9, for different magnifications.

Appendix 1 provides further operating parameters of the laser to produce a desired periodic arrangement of structures on the surface according to further embodiments.

Figure 10:
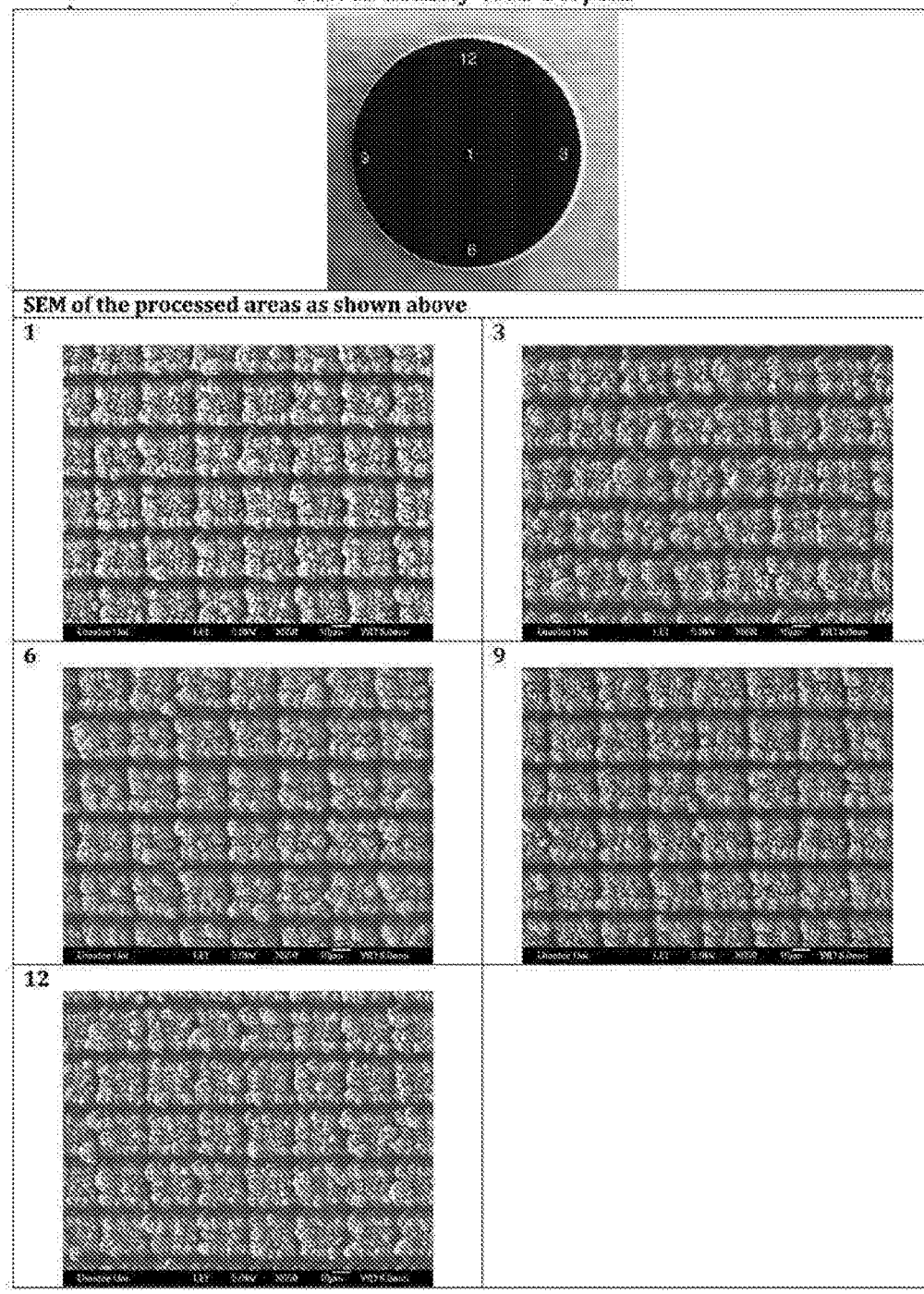
FIGS. 10 to 27 show images of further samples, following laser treatment to form periodic structures on the surfaces of the further samples.

FIG. 10 shows an image of a copper sample following laser treatment to form periodic structures (in this case cross-hatched structures) on the surface of the sample as described. Five SEM images at five points (labelled 1, 3, 6, 9, 12) on the surface are also included in FIG. 5 and show top-hat pyramid structures.

Figure 11:
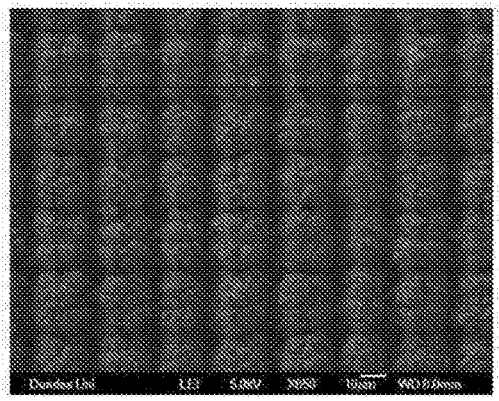
Figure 11:
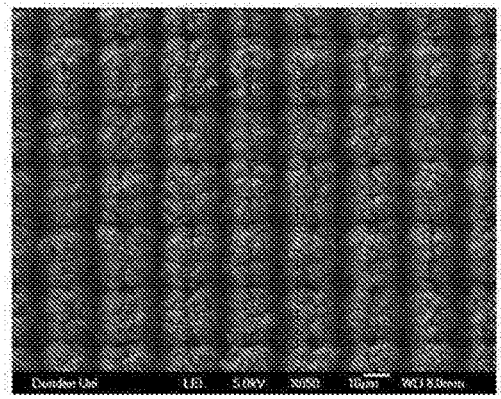
Figure 11:
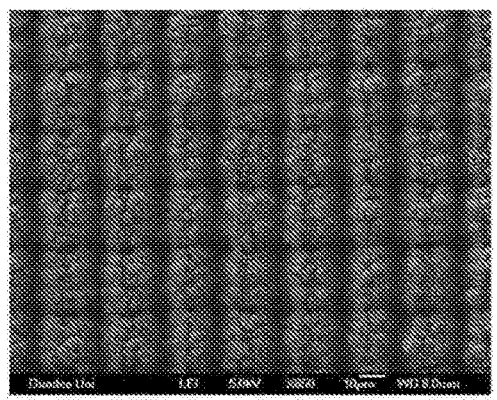
Figure 11:
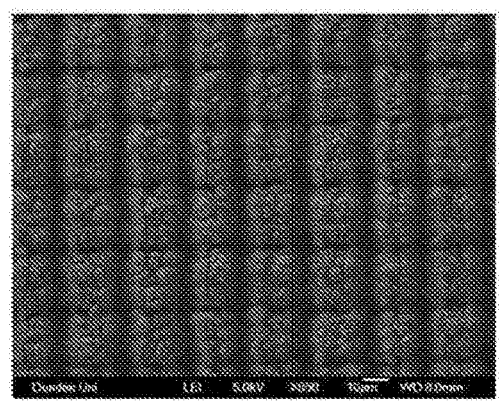
Figure 11:
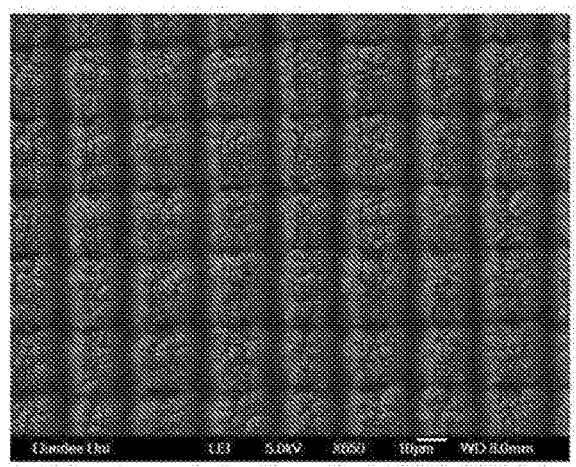

FIG. 11 shows SEM images of further surfaces, labelled (a) to (e), following laser treatment to form periodic structures (in this case cross-hatched structures) on the surface of the sample as described. Each different sample was subject to pulses of a respective different power density as indicated in FIG. 11.

Figure 12:
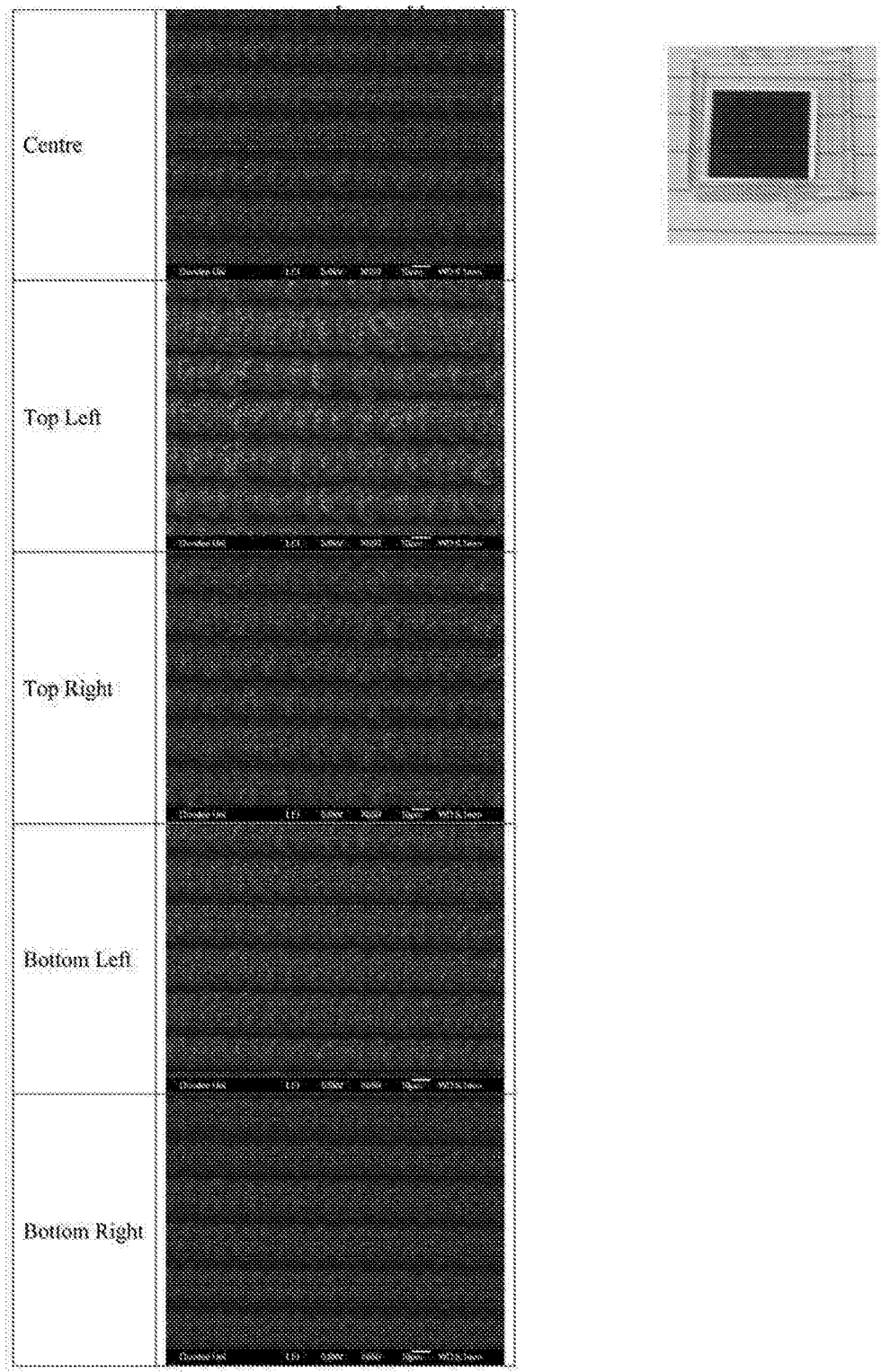

FIG. 12 shows an image of a sample following laser treatment to form periodic structures (in this case parallel lines) on the surface of the sample. Five SEM images at five regions of the sample surface are also shown. The sample was subject to laser pulses of power density equal to 0.4 TW/cm$^2$.

Figure 13:
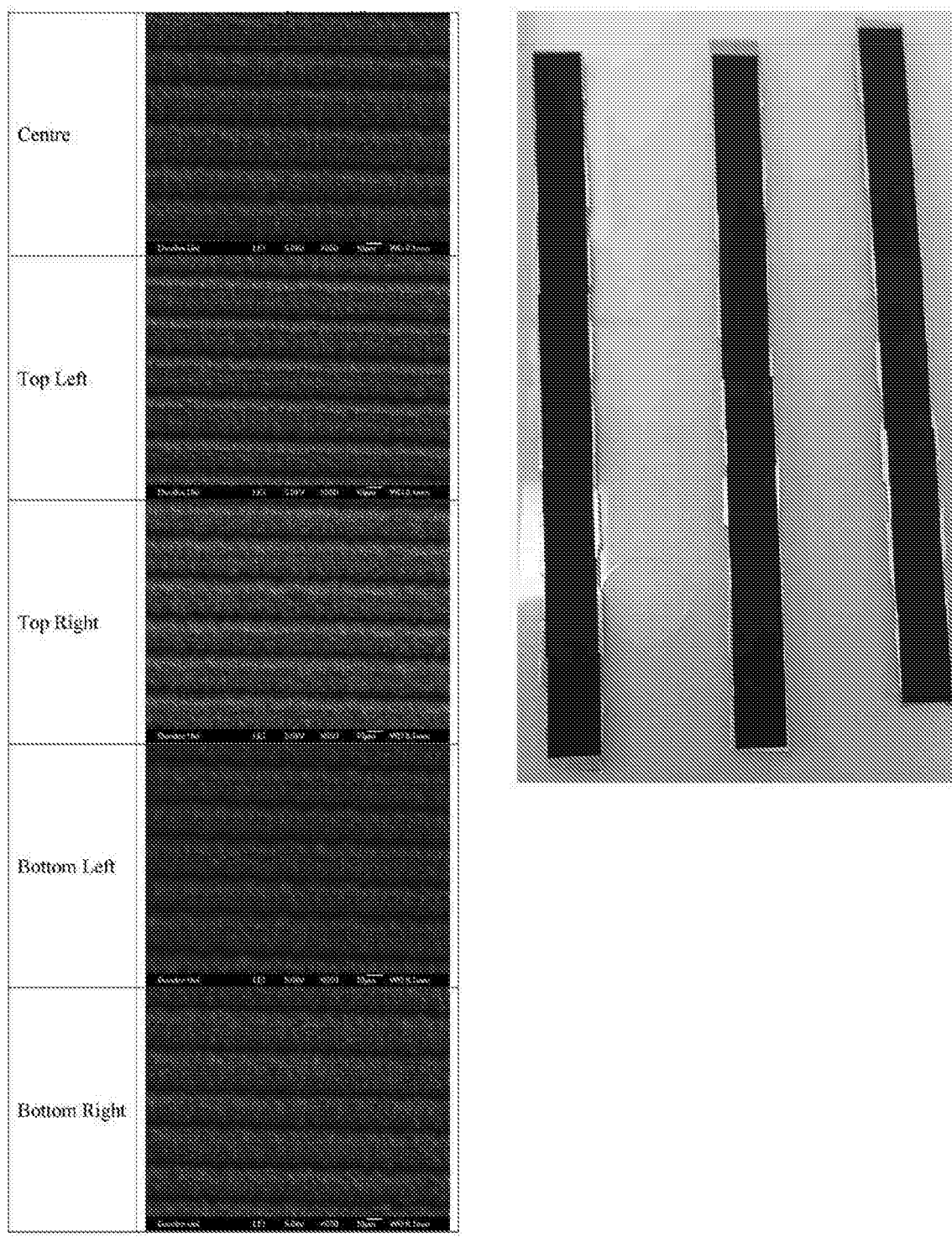

FIG. 13 shows images of three samples following laser treatment to form periodic structures (in this case parallel lines) on the surface of the samples as described. Five SEM images at five regions of the surface of one of the samples are also shown. The sample was subject to laser pulses of power density equal to 0.2 TW/cm$^2$.

Figure 14:
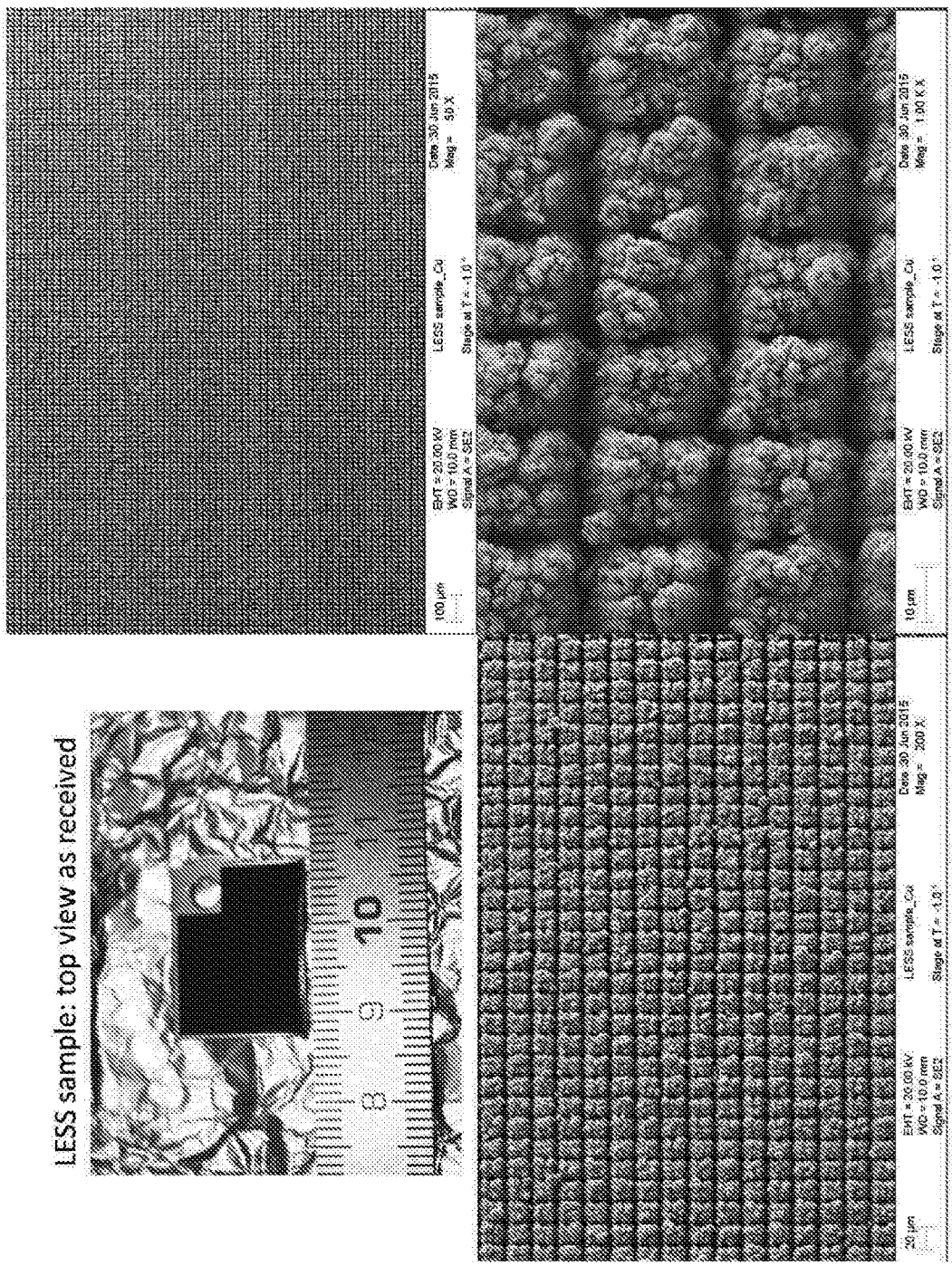

FIG. 14 shows an image of a copper sample, following laser treatment to form periodic structures on the surface as described. FIG. 14 also shows SEM images of regions of the surface at different magnifications.

Figure 15:
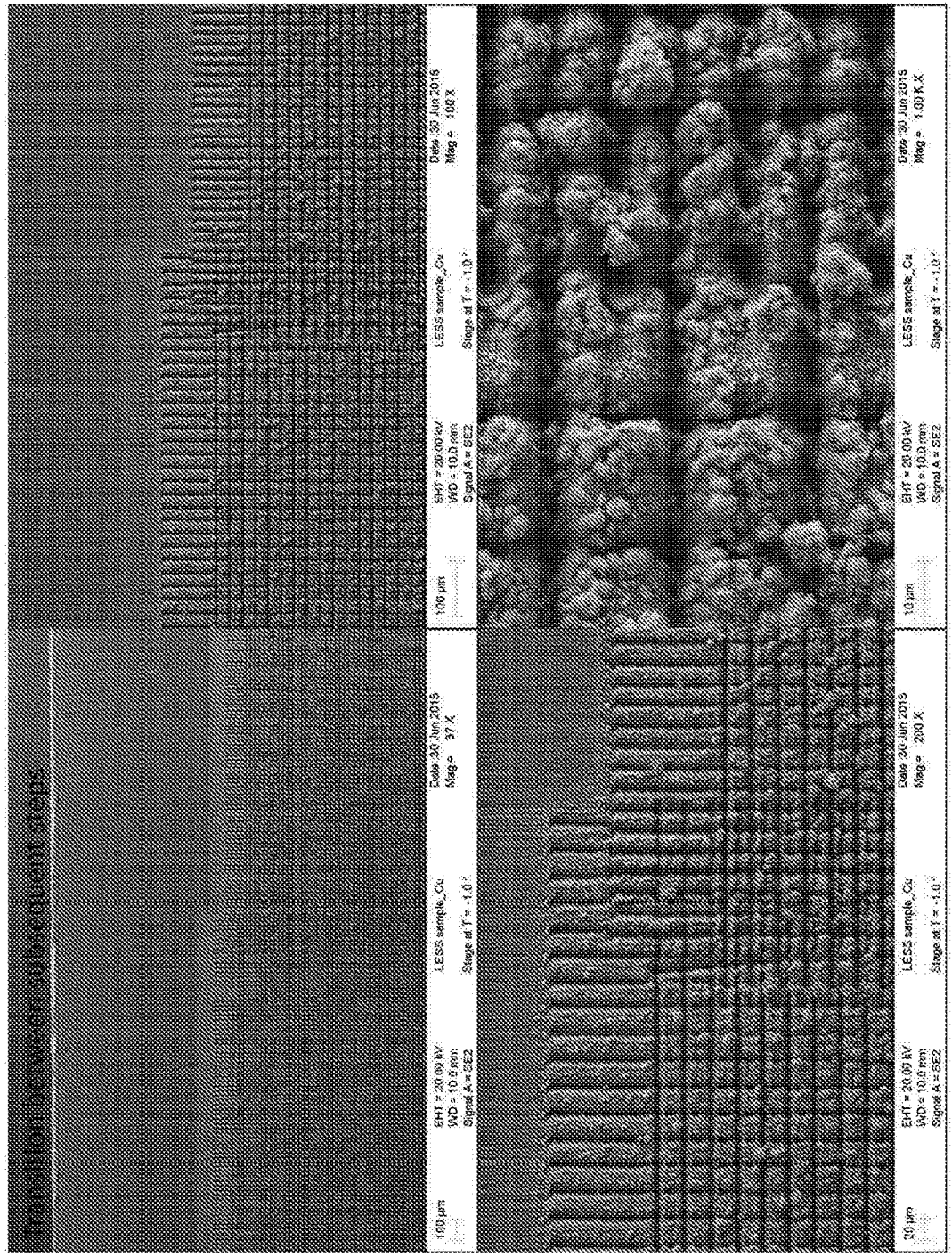

FIG. 15 shows SEM images, at various magnifications, of different regions of the surface of a copper sample, following laser treatment to form periodic structures on the surface as described.

Figure 16:
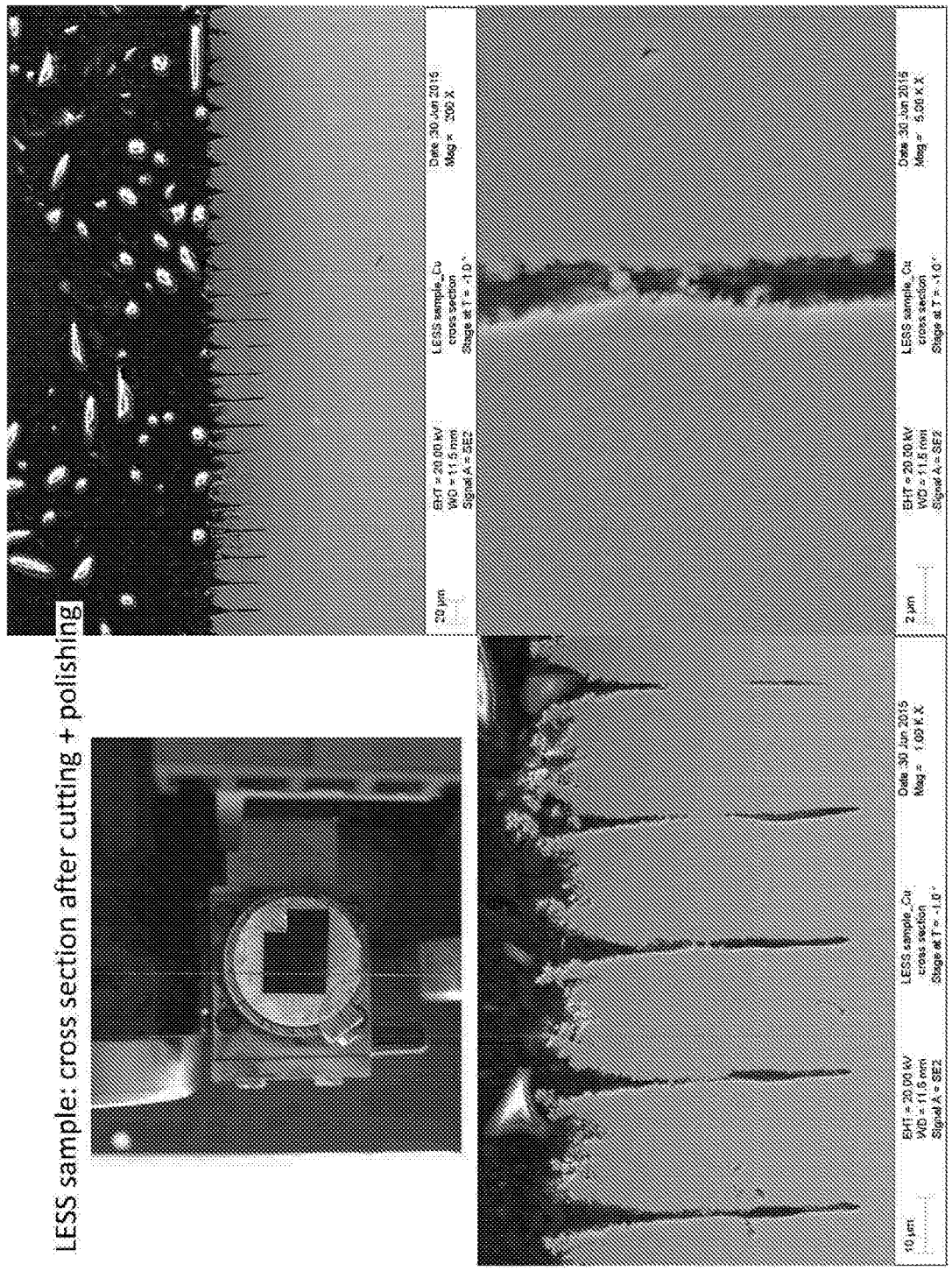

FIG. 16 shows SEM images at various magnifications of a cross-section of a copper sample following laser treatment to form periodic structures on the surface as described, and following cutting and polishing, together with a further image of the sample in face-on view.

Figure 17:
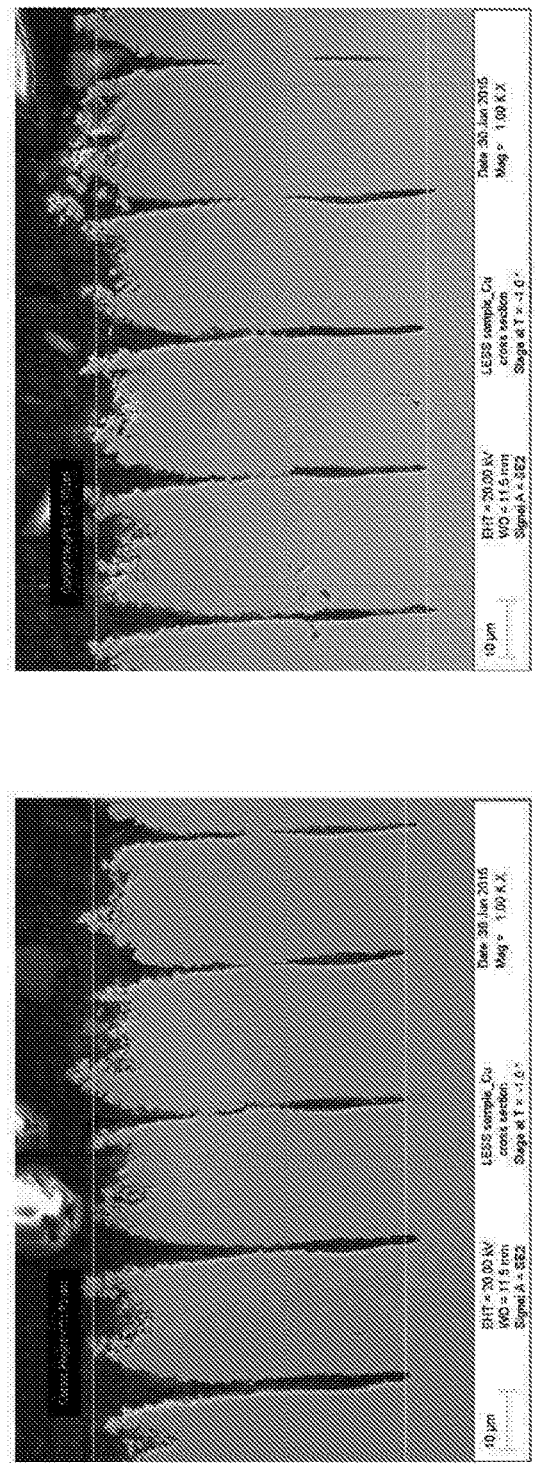
Figure 17:
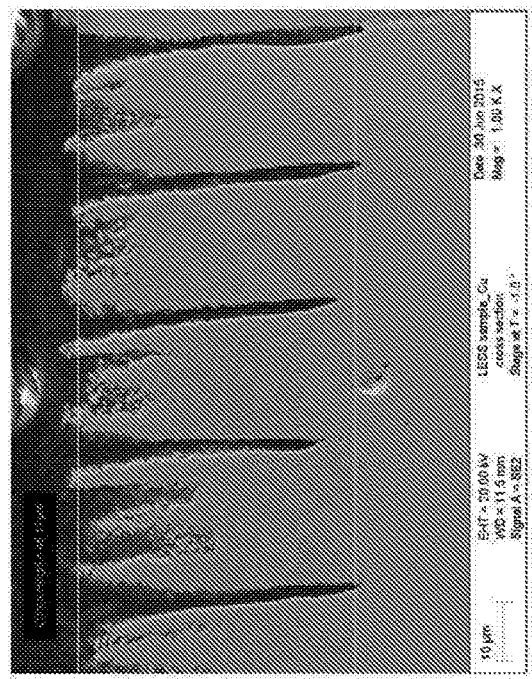
Figure 18:
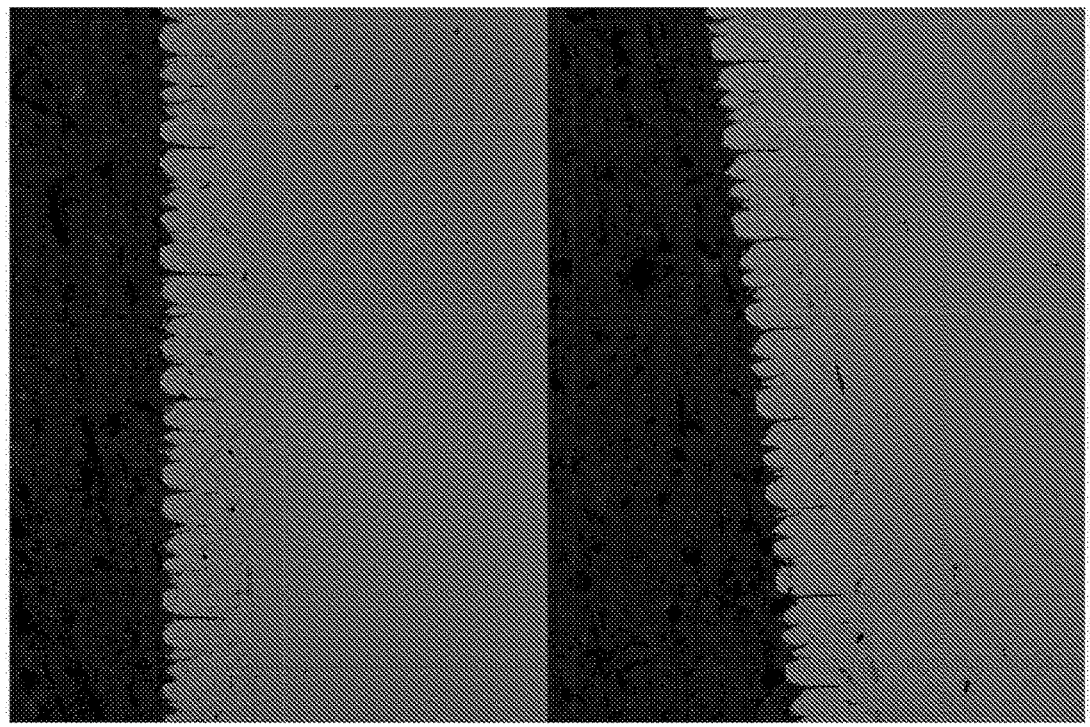
Figure 18:
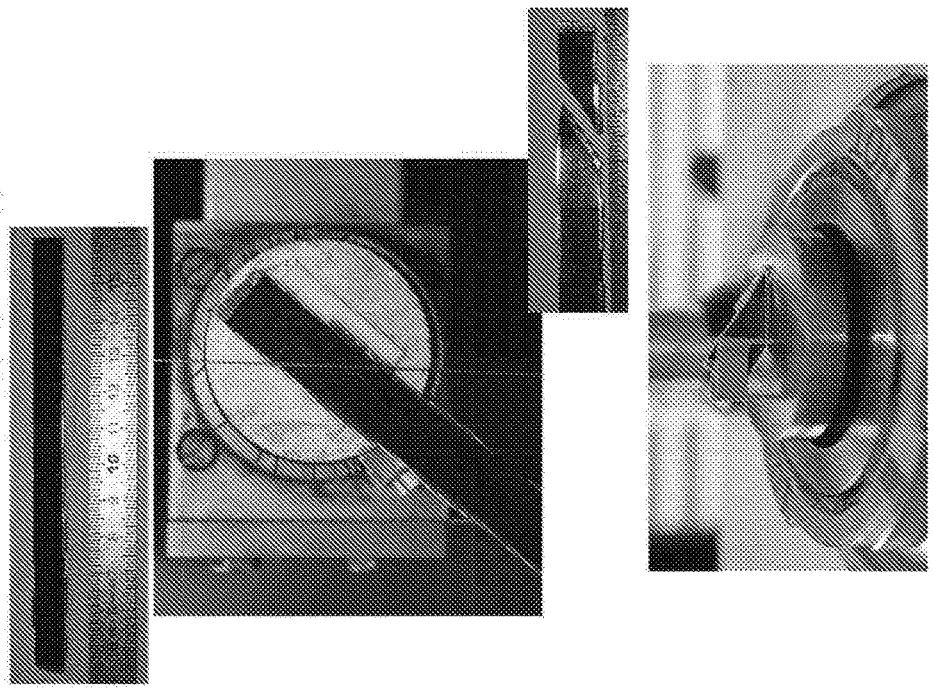

FIG. 17 shows SEM images of a cross-section of a copper sample at different regions of the sample, following laser treatment to form periodic structures on the surface, FIG. 18 shows images of a co-laminated sample comprising a copper layer on a stainless steel layer, following laser treatment to form periodic structures on the surface as described, and SEM images of cross-sections of the sample.

Figure 19:
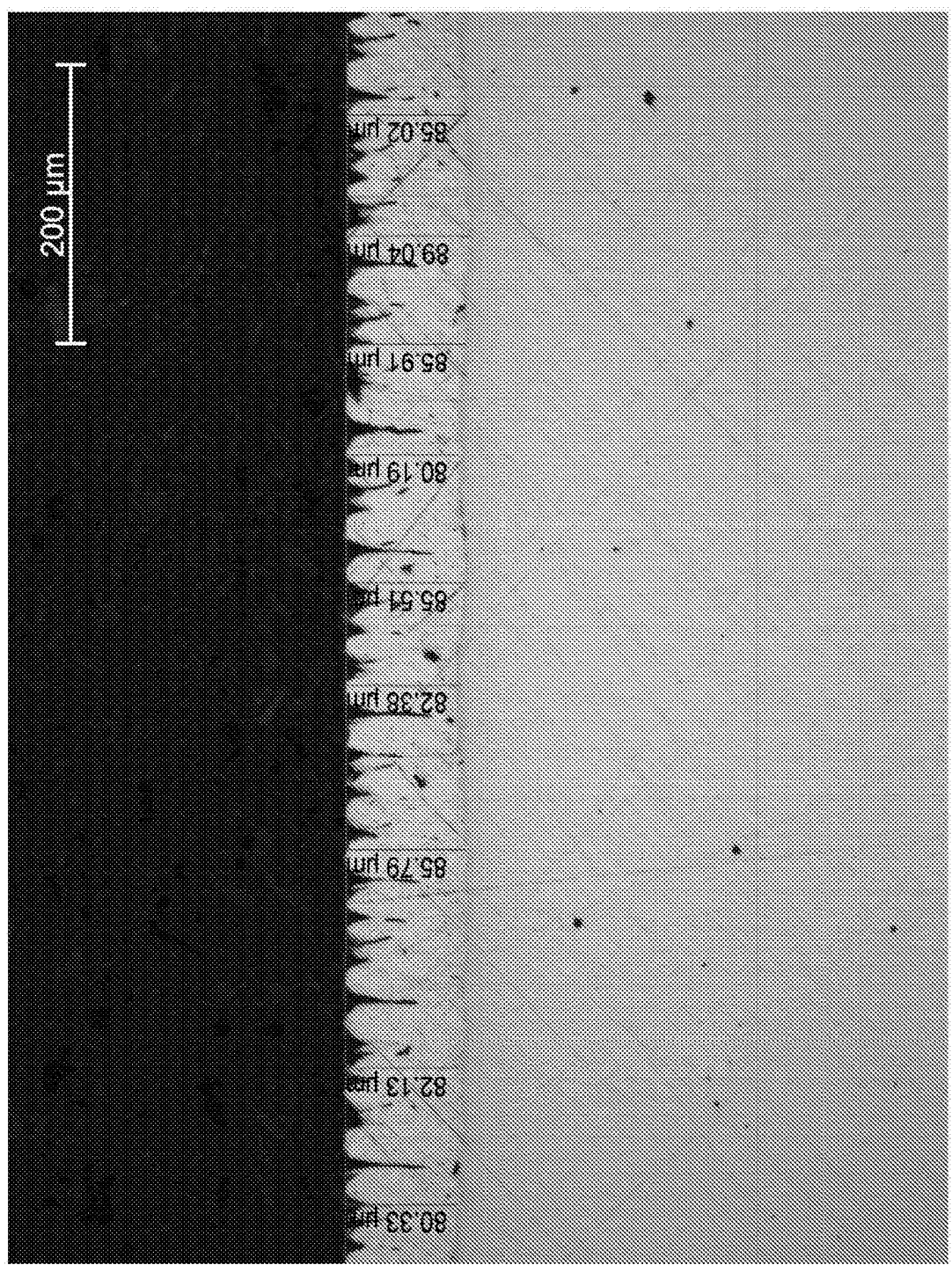

FIG. 19 shows a further SEM image of a cross-section of a sample, following laser treatment to form periodic structures on the surface as described.

Figure 20:
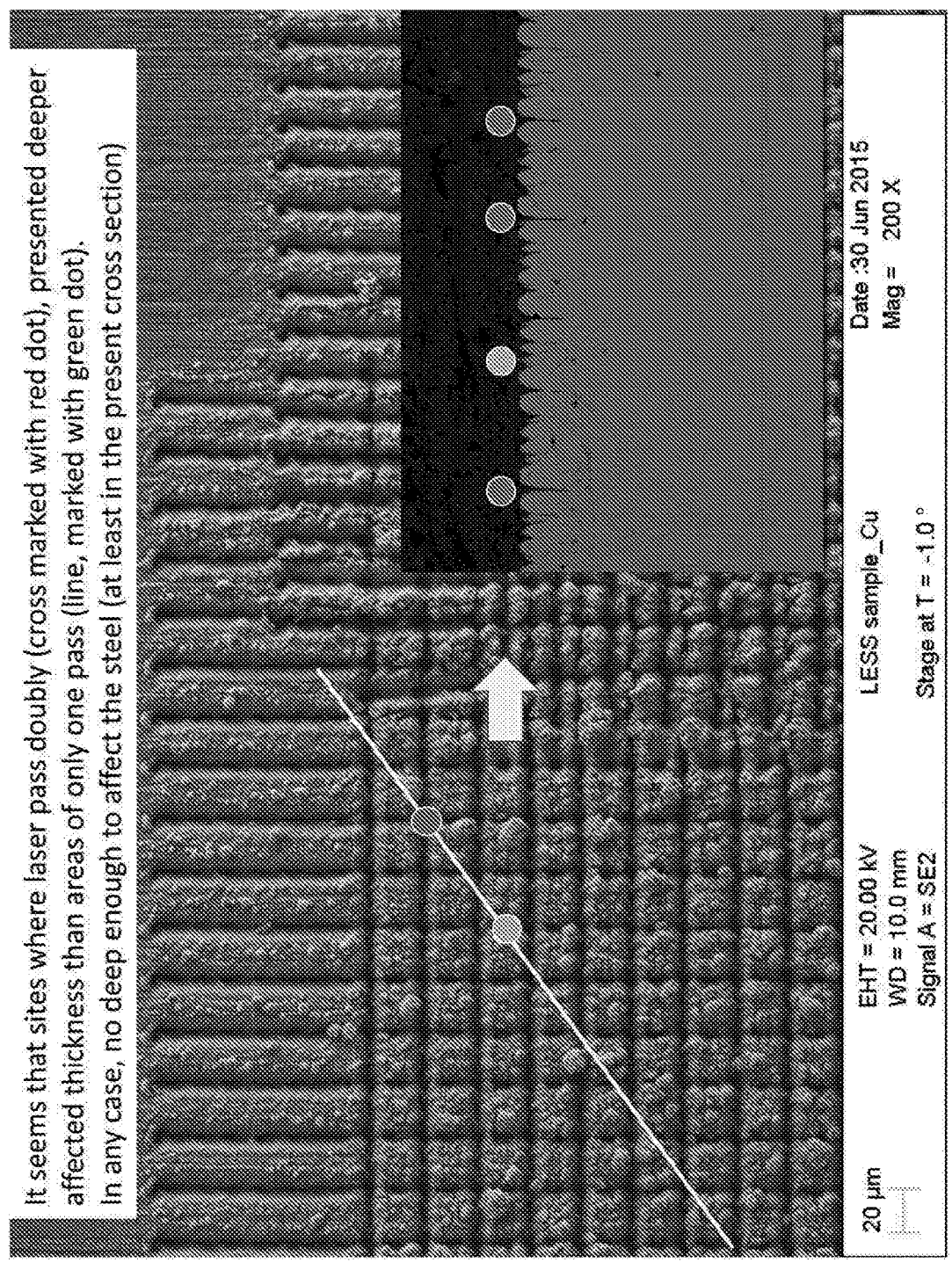

FIG. 20 shows an SEM image of a sample in face-on view, following laser treatment to form periodic structures on the surface as described. An inset image is included in the figure, and is an SEM cross-sectional image of a cross-section running along a line indicated in the face-on image. Corresponding positions on the face-on image and the cross-sectional image are marked with dots. There are three red dots (showing darker in black and white version of the figure) and one green dot (showing lighter in black and white version of the figure). The red dots indicate regions where the laser passed twice and the green dot indicates a region where the laser passed once. It can be seen in the cross-sectional image that two passes of the laser produced deeper valleys/troughs than one pass of the laser.

Figure 21:
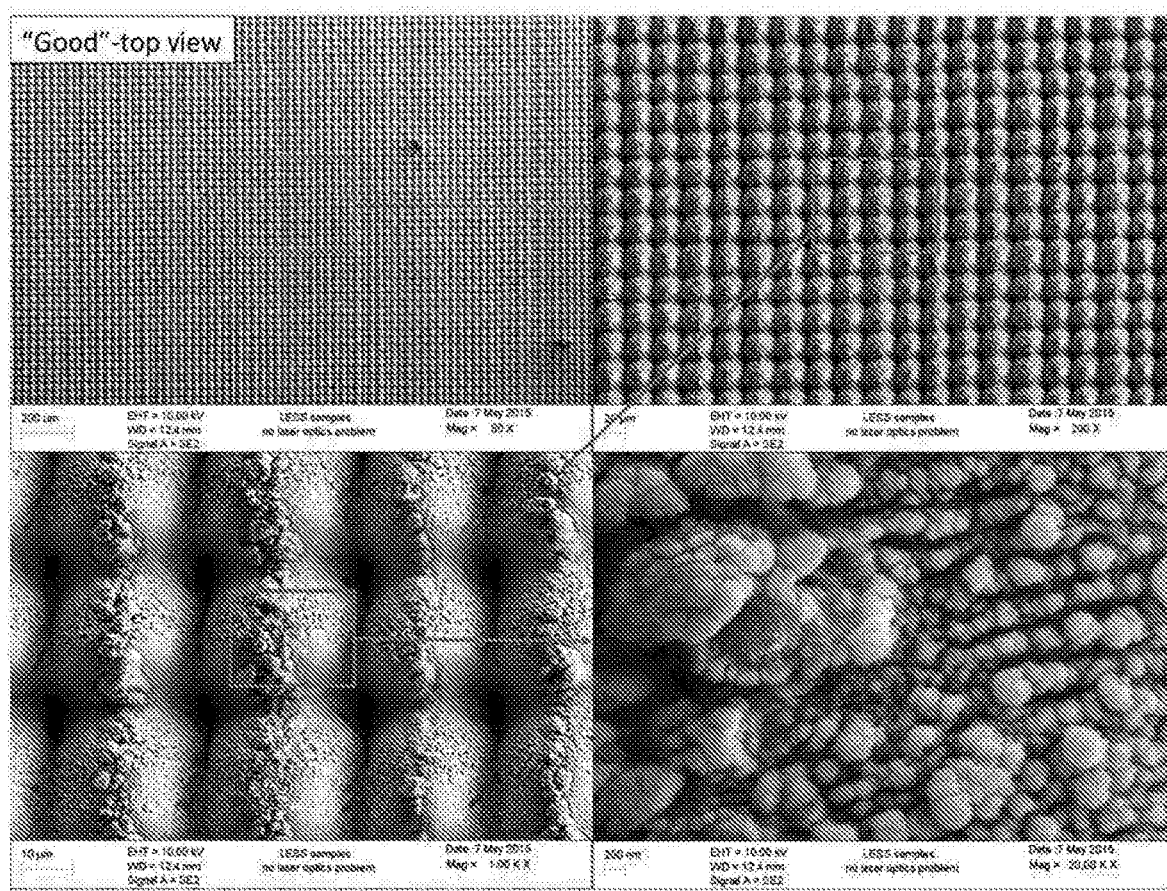

FIG. 21 shows SEM images of a surface of a copper sample following laser treatment to form periodic structures on the surface as described. The laser treatment used laser pulses of wavelength 532 nm and laser pulse power density of 29.6 GW/cm$^2$. The laser pulses were ps laser pulses and the power density was selected by selecting an appropriate laser spot size.

Figure 22:
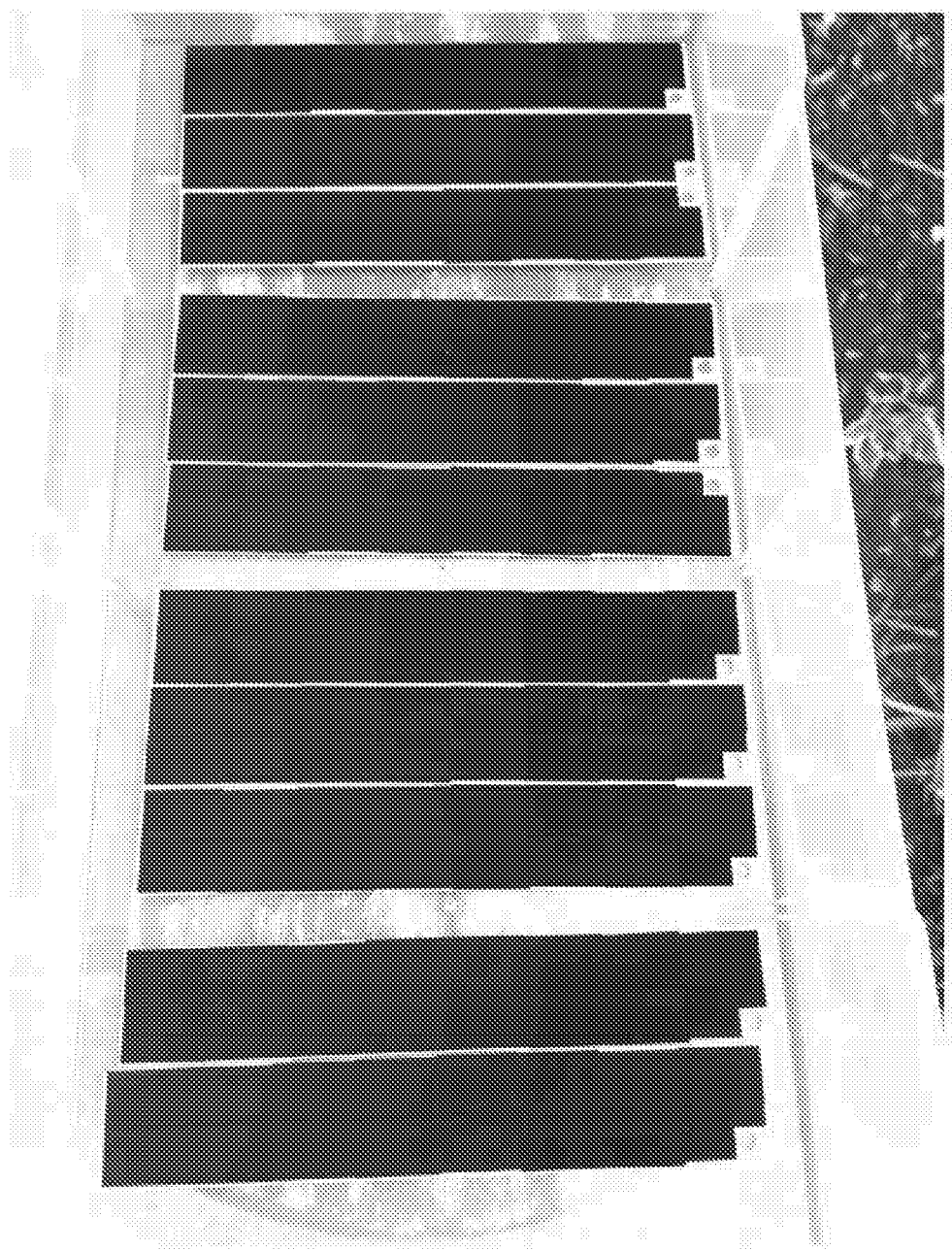

FIG. 22 is an image of sample surfaces, including for the copper sample of FIG. 21.

Figure 23:
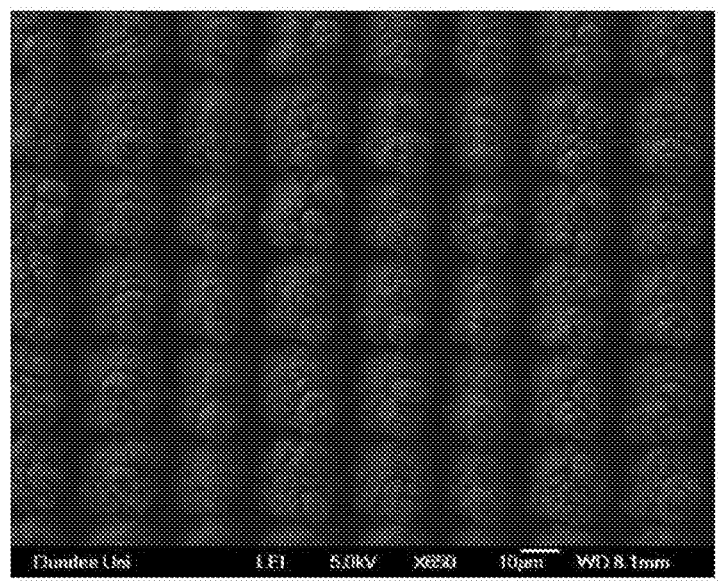

FIG. 23 shows an image of a surface of a sample following laser treatment to form periodic structures (in this case cross-hatching) on the surface as described.

Figure 24:
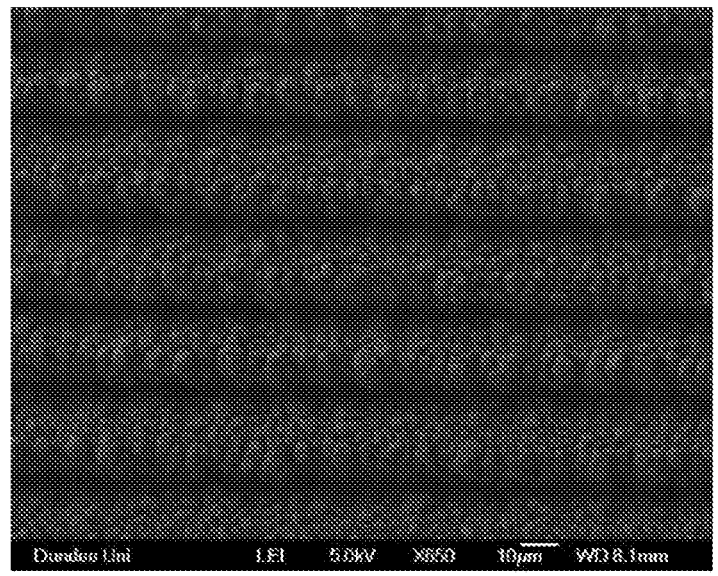

FIG. 24 shows an image of a surface of a sample following laser treatment to form periodic structures (in this case grooves) on the surface as described.

Figure 25:
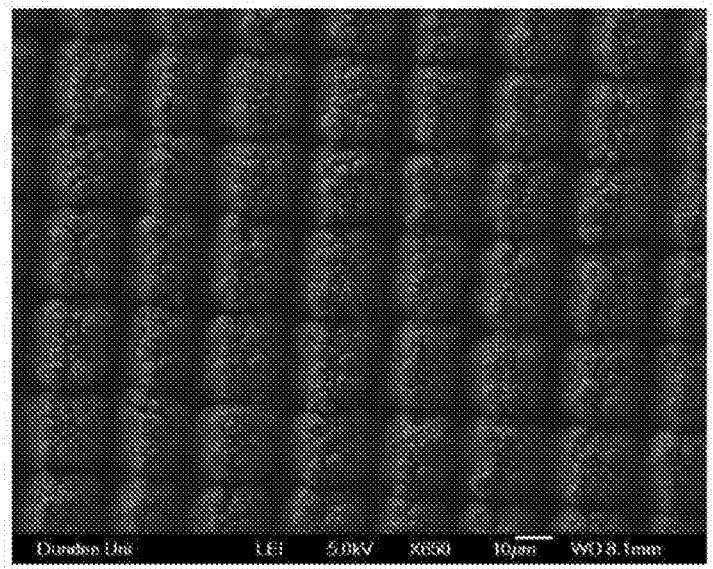

FIG. 25 shows an image of a surface of a sample following laser treatment to form periodic structures (in this case cross-hatching) on the surface as described.

Figure 26:
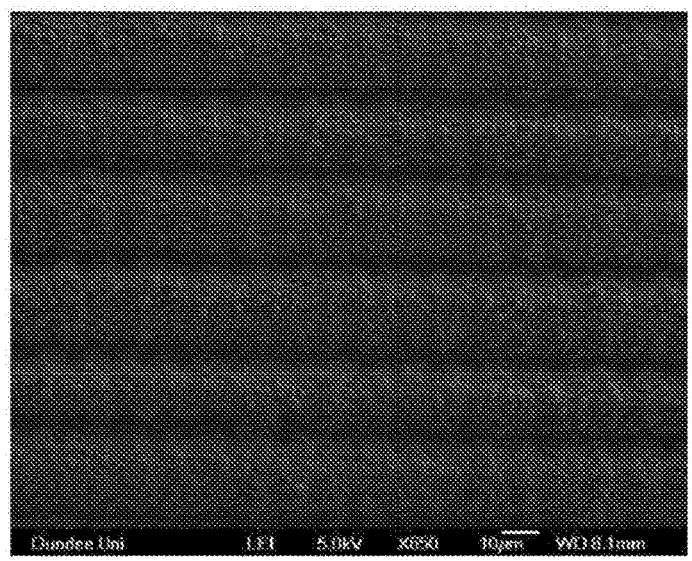

FIG. 26 shows an image of a surface of a sample following laser treatment to form periodic structures (in this case grooves) on the surface as described.

Figure 27:
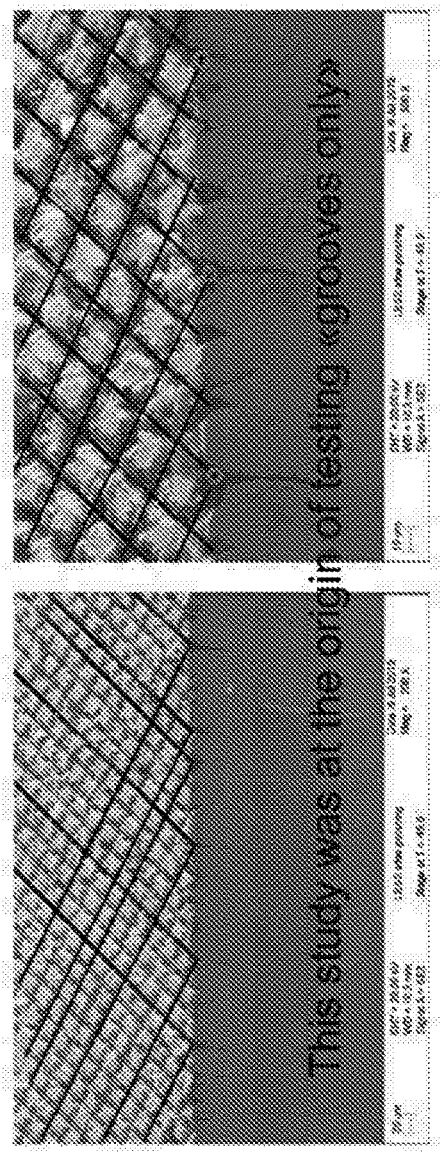

FIG. 27 shows further images of surfaces of samples following laser treatment to form periodic structures on the surface of the samples as described.

Without wishing to be bound by theory, and without limitation to the scope of protection, the following comments are provided which relate to processes which may occur in relation to at least some embodiments.

Laser engineering provides an overarching methodology that provides for the formation of periodic structures according to embodiments. Precision laser engineering is expected to excite free electrons within metals, vibrations within insulators, and indeed both types of excitations within semiconductors. The mechanisms by which lasers can engineer materials include the following:
(i) Photo-thermal interaction (PTI)—commonly achieved using laser beams providing short dwell time (e.g. lasers with nanosecond pulsewidth);
(ii) Photo-ablation interaction (PAI)—envisaged using laser beams providing ultra-short dwell time (e.g. lasers with picosecond or femtosecond pulsewidth).

In the PTI regime the focused laser beam acts as a spatially confined, intense heat source. Targeted material is heated up rapidly, eventually causing it to be vaporized. Without wishing to imply any limitation to the scope of protection, the targeted material could be referred to as being boiled away. An advantage of this approach is that it may enable rapid removal of relatively large amount of target material. However, the peripheral heat affected zone (HAZ) damage and the presence of some recast material after processing present limitations in terms of heat confinement for precision laser materials engineering.

In the PAI regime, the laser drives multi-photon absorption of light inside the material. This strips electrons from the material, which then explode away due to Coulomb repulsion. Because PAI involves directly breaking the molecular or atomic bonds that hold the material together, rather than simply heating it, it is intrinsically not a 'hot' process. Since the material is removed in a very short timeframe, the ablated material carries away most of the energy before heat can spread into the surrounding material. These effects may result in a significantly reduced HAZ. Furthermore, this is a clean process and may leave minimal recast material, thereby eliminating the need for elaborate post-processing. The PAI mechanism is compatible with a very broad range of materials, including high band-gap materials that have low linear optical absorption and therefore are difficult to engineer with existing techniques. The PAI mechanism can be considered 'wavelength neutral'; that is, nonlinear absorption can be reduced even if the material is normally transmissive at the laser wavelength.

The PAI mechanism should allow for custom design of electron work function of surfaces.

Figure 28A:
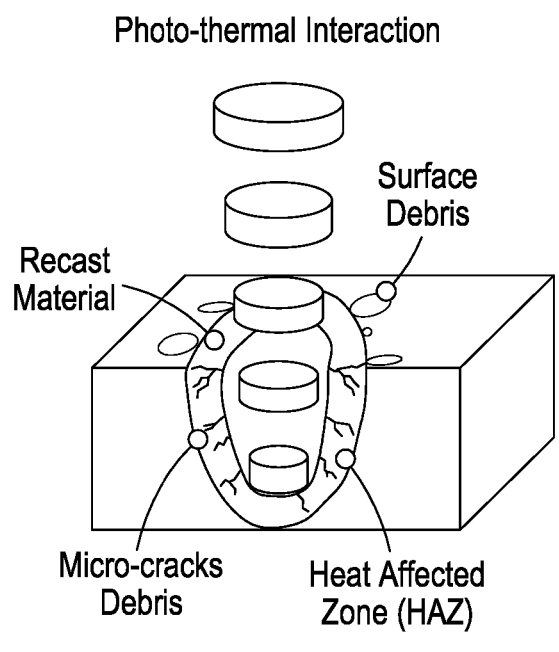
FIGS. 28a and 28b are schematic illustrations of laser interaction mechanisms.
Figure 28B:
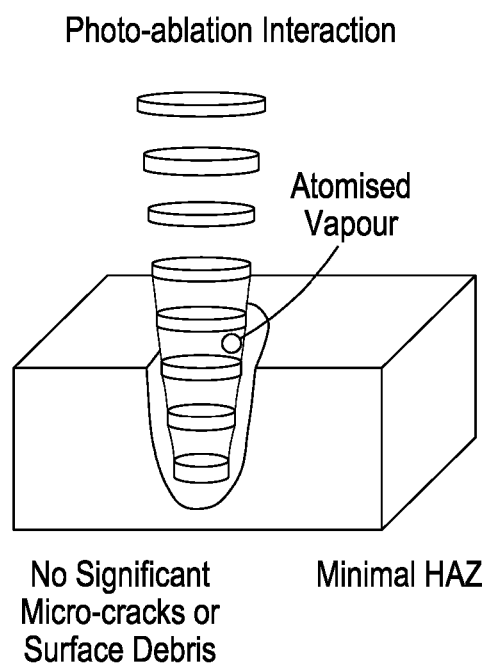

The PTI and PAI mechanism are illustrated schematically in FIGS. 28a and 28b respectively.

It is a further feature of embodiments that the characteristics of the pulsed radiation that is applied to the surface, for example the use of pulse durations in the picosecond range or less, are such that the periodic structures that are formed are of shallower depth and/or more gently sloped than features formed using pulsed radiation of higher energy and/or longer duration for example pulse durations in the nano-second range.

Again, without wishing to be bound by theory, and without limitation to the scope of protection, the following comments are provided which relate to processes which may occur in relation to at least some embodiments.

In irradiation at very high intensities (or high irradiance) one is confronted with the issue of a dense, strongly absorbing material, in the first few tens of nm of which energy at a rate of some $10^{20}$ W/cm$^3$ is liberated. Part of this energy, once randomised, is conducted into the bulk of the material, while part is converted into directed kinetic energy by thermal expansion of the heated layer. Two regimes are distinguished in this respect.

1. Nanosecond pulsed laser interaction which is dominated by the expansion and ablation of material. Here the thermal pressure of the heated layer is sufficient to cause significant compression of the underlying target material.

2. Picosecond pulsed laser interaction (for example in accordance with some embodiments described herein) which is heat conduction dominated since hydrodynamic motion during the pulse duration is negligible (laser pulses here may be 1000 times or more shorter than nanosecond ones). An important point here is that in the picosecond regime the strong heating of the dense material occurs before hydrodynamic expansion of the processed layer has even started. The plasmas produced in this regime have essentially the same density as the solid target itself. This—upon cooling—leads to the formation of fine structures—in the range from 1 micrometres to 50 micrometres depending on the irradiation parameters—covered with nano-structures.

Using picosecond duration pulsed radiation according to some embodiments can in some cases also cause formation of nano-ripples or other small scale structures on the surface in addition to the larger scale peaks and troughs obtained by scanning the laser beam in an appropriate pattern over the surface. It is possible that such nano-ripples or other small scale structures may in some cases decrease the reflectivity of the surface further, in addition to the reduction obtained by larger periodic peak and trough structures. Furthermore, in some cases the nano-ripples or other small scale structures and/or the shallower peaks and troughs associate with picosecond rather than nanosecond pulses may also provide other improved or alternative properties of the surface, for example reduced induction, and/or can provide the surface with an increased area at the nano- or micro-scale.

It will be understood that the present invention has been described above purely by way of example, and modifications of detail can be made within the scope of the invention. Each feature in the description, and (where appropriate) the drawings may be provided independently or in any appropriate combination with any other such feature.

rate in a range 10 kHz to 1 MHz and an average power of the laser radiation is in a range 0.3 W to 20 W;

a pulse duration of the laser pulses is in a range 200 femtoseconds (fs) to 1000 picoseconds (ps) or in a range 1000 ps to 200 ns, and the applying of the laser radiation to the surface comprises scanning the pulsed laser beam over the surface such that the periodic arrangement of structures on the surface comprises a periodic series of peaks and troughs substantially parallel to each other.

2. A method according to claim 1, wherein at least some of the laser pulses have a duration less than a thermal relaxation time of the material of the surface.

APPENDIX I

2. TYPE -C, for example processed in AIR

For copper: Specific parameters for certain embodiments are given below. For what may be called Type C (LESS) structures we are in the $TW/cm^2$ regime. Here the physical mechanism is "Extreme Photo-thermal Ablation" (Photo-ablation). You can see that for the structures called below Type AC we are once again in the "Photo-thermal Ablation" regime - please see the power densities - they are in $GW/cm^2$.

Pulse durations of 200 fs - 1000 ps may be proided and intensities may be in the $TW/cm^2$ range (for example from 0.1 $TW/cm^2$ to 3 $TW/cm^2$) for example for our Type C (LESS), which may lead to the Extreme Photo-thermal Ablation (Photo-ablation)" mechanism for the formation of periodic structures.

Specific parameter values for Copper, Stainless Steel and Aluminium may be as follows a) Wavelength of 532 nm; Pulse width of the laser: from 200 femtosecond to 1000 picosecond; Focal spot diameter on the target: from 1 μm - to 100 μm; Repetition rate of the laser from 10 kHz to 1 MHz; Average power from 0.3 W to 5 W; Scan speeds of 1 mm/s to 100 mm/s; Repetition number of scans from 1 to 10; Hatch Distance from 0.5 μm to 100 μm; angle of incidence of the laser beam from 0 to 30 degrees.

b) Wavelength of 1064 nm; Pulse width of the laser: from 200 femtosecond to 200 picosecond; Focal spot diameter on the target: from 1 μm to 100 μm; Repetition rate of the laser from 10 kHz to 1 MHz; Average power from 0.3 W to 5 W; Scan speeds of 1 mm/s to 100 mm/s; Repetition number of scans from 1 to 10; Hatch Distance from 0.5 μm to 100 μm; angle of incidence of the laser beam from 0 to 30 degrees.

| $\lambda$, [nm] | $\tau$, [ps] This is a nominal pulse length | r, [μm] | $\gamma$, [kHz] | $P_{avg}$, [W] | V, [mm/s] | $P_{peak}$ [MW] | N | $E_p$ [μJ] | Power Density (Intensity) [$TW/cm^2$] | F, [$J/cm^2$] |
|---|---|---|---|---|---|---|---|---|---|---|
| Copper (Cu) - the parameters below, - these structures are also good for impedance and outgassing. For our reference I will call these structures Type C (LESS) | | | | | | | | | | |
| 532 | 10 | 12 | 200 | 0.94 (Range of powers from 0.36 W to 1.22 W) give similar results - see SEM images | 10 | 0.47 | 1 | 4.7 | 0.41 | 4.16 |
| Copper (Cu) - the parameters below - these structures may not be suitable for some purposes since the SEY is not below 1. Please note the Power Density. Here we are coming out of the regime. I will call these for our reference Type AC (532) | | | | | | | | | | |
| 532 | 10 | 40 | 200 | 0.75 | 10 | 0.37 | 1 | 3.75 | 29.6 $GW/cm^2$ | 3 |
| Copper (Cu) - the parameters below Please note the Power Density. Here we are once again coming out of the regime. See also that we are using 1664 nm instead of 532 nm. I will call these for our reference Type AC (1064) | | | | | | | | | | |
| 1064 | 10 | 70 | 200 | 3.27 | 10 | 1.6 | 1 | 16 | 41.5 $GW/cm^2$ | 0.41 |

The invention claimed is:

1. A method of blackening a surface, comprising:
applying laser radiation to the surface to produce a periodic arrangement of structures on the surface, wherein
the laser radiation comprises pulsed laser radiation comprising a series of laser pulses and the power density of the pulses is in a range 1 $GW/cm^2$ to 50 $GW/cm^2$;
the laser radiation comprises a pulsed laser beam that has a focal spot diameter on the surface in a range 1 μm to 100 μm and the pulsed radiation has a pulse repetition 3. A method according to claim 1, wherein the peaks are flat on top and/or are rounded on top and/or have no pointed and/or or sharp regions on top.

4. A method according to claim 1, wherein the peak to trough distance for at least some of the peaks, and/or an average or median peak to trough distance, is in a range 5 μm to 100 μm, optionally in a range 20 μm to 80 μm, optionally in a range 30 μm to 60 μm.

5. A method according to claim 1, wherein the periodic arrangement of structures comprise a cross-hatched arrangement or an arrangement of substantially parallel lines of peaks and troughs substantially without cross-hatching.

6. A method according to claim 1, comprising performing a single pass of the laser source across the surface to produce the periodic arrangement of structures.

7. A method according to claim 1, wherein a scan speed for the scanning is in a range 1 mm/s to 200 mm/s.

8. A method according to claim 1, wherein the scanning of the pulsed laser beam over the surface is repeated between 2 and 10 times, or is performed once.

9. A method according to claim 1, wherein an angle of incidence of the laser radiation to the surface is in a range from 0 to 30 degrees or from 90 degree to 60 degrees.

10. A method according to claim 1, wherein a wavelength of the radiation is in a range 100 nm to 2,000 nm, optionally 532 nm or 528 nm or 1030 nm or 1064 nm or 1070 nm.

11. A method according to claim 1, wherein the applying of the laser radiation to the surface is such as to produce further structures, and the further structures are smaller than the structures of said periodic arrangement of structures.

12. A method according to claim 11, wherein the further structures comprise further periodic structures, optionally ripples or nano-ripples.

13. A method according to claim 11, wherein the further structures comprise laser induced periodic surface structures (LIPPS).

14. A method according to claim 11, wherein the further structures have a periodicity in a range 10 nm to 1 µm, optionally in a range 100 nm to 1 µm.

15. A method according to claim 11, wherein the further structures cover at least part of the periodic array of structures and/or are formed in the troughs and/or on the peaks of the periodic arrangement of structures.

16. A method according to claim 1, wherein the surface comprises a metal surface, optionally a copper, aluminium, stainless steel or titanium surface.

17. A method according to claim 1, wherein the surface comprises or forms part of one or more of a computing device, a communications device, a security device, a medical device, an identification device, a financial transaction device, an optical device, a storage device.

18. A method according to claim 1, comprising applying the laser radiation such as to produce the periodic arrangement of structures on the surface over a selected area, wherein the selected area comprises or represents one or more of an image, an identifier, a marker, a security marker.

19. A method according to claim 1, comprising applying the laser radiation such as to produce the periodic arrangement of structures on the surface to form at least one of an image, an identifier, a marker, a security marker.

20. A method according to claim 1, comprising applying the radiation using a solid-state laser, optionally the solid state laser comprises a Nd:YVO$_4$ or Nd:YAG or Yb:YAG or Nd:KGW or Nd:KYW or Yb:KGW or Yb:KYW laser, or a pulsed fibre laser, optionally a Yb, Tm or Nd pulsed fibre laser, optionally wherein applying the radiation comprises using the fundamental wavelength of operation of the laser or its second or third harmonic.

21. An apparatus for blackening a surface, comprising:
 a laser source for applying pulsed laser radiation to a surface; and
 a laser controller configured to control the laser source to apply the laser radiation as a series of laser pulses thereby to form a periodic arrangement of structures on the surface, wherein the power density of the pulses is in a range 1 GW/cm$^2$ to 50 GW/cm$^2$, wherein
 the laser radiation comprises a pulsed laser beam that has a focal spot diameter on the surface in a range 1 µm to 100 µm and the pulsed radiation has a pulse repetition rate in a range 10 kHz to 1 MHz and an average power of the laser radiation is in a range 0.3 W to 20 W;
 a pulse duration of the laser pulses is in a range 200 femtoseconds (fs) to 1000 picoseconds (ps) or in a range 1000 ps to 200 ns; and
 the applying of the laser radiation to the surface comprises scanning the pulsed laser beam over the surface such that the periodic arrangement of structures on the surface comprises a periodic series of peaks and troughs substantially parallel to each other.

* * * * *